US010530655B2

(12) United States Patent
Usuda et al.

(10) Patent No.: US 10,530,655 B2
(45) Date of Patent: Jan. 7, 2020

(54) CONTROL APPARATUS IN A PLURALITY OF CONTROL APPARATUSES FOR MANAGING MANAGEMENT INFORMATION

(71) Applicant: FUJITSU LIMITED, Kawasaki-shi, Kanagawa (JP)

(72) Inventors: Yosuke Usuda, Kamitakai (JP); Toshio Iga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 183 days.

(21) Appl. No.: 15/242,634

(22) Filed: Aug. 22, 2016

(65) Prior Publication Data

US 2017/0078151 A1 Mar. 16, 2017

(30) Foreign Application Priority Data

Sep. 11, 2015 (JP) ................................. 2015-179377

(51) Int. Cl.
*H04L 12/24* (2006.01)
*G06F 3/06* (2006.01)

(52) U.S. Cl.
CPC ...... *H04L 41/0893* (2013.01); *H04L 41/0813* (2013.01)

(58) Field of Classification Search
CPC ............. H04L 41/0813; H04L 41/0873; H04L 41/0893; H04L 67/10; G06F 3/067; G06F 3/0658; G06F 3/061
See application file for complete search history.

(56) References Cited

U.S. PATENT DOCUMENTS 6,438,563 B1 * 8/2002 Kawagoe ............ G06F 11/1658
9,043,460 B1 * 5/2015 Kim ...................... H04L 41/046
370/352
(Continued)

FOREIGN PATENT DOCUMENTS

JP           57-109049        7/1982
JP         2002-116939 A      4/2002
(Continued)

OTHER PUBLICATIONS

Japanese Office Action dated Feb. 26, 2019 for corresponding Japanese Patent Application No. 2015-179377, with English Translation, 7 pages.

*Primary Examiner* — Alina A Boutah
(74) *Attorney, Agent, or Firm* — Fujitsu Patent Center

(57) ABSTRACT

A first control apparatus of multiple control apparatuses in a system, including a memory unit and a processor. The memory unit stores multiple management information managed by respective control apparatuses and multiple modification information indicating update statuses of respective management information. In response to receiving first modification information corresponding to first management information managed by the first control apparatus from a second control apparatus, the processor compares the received first modification information, with first modification information stored in the memory unit. When the received first modification information does not match the first modification information stored in the memory unit, the processor notifies the second control apparatus of a response including information about the first management information and the first modification information stored in the memory unit, to cause the first management information and the first modification information stored in the second control apparatus, to be updated.

16 Claims, 31 Drawing Sheets

(56) References Cited

U.S. PATENT DOCUMENTS

| | | | | |
|---|---|---|---|---|
| 2004/0213247 A1* | 10/2004 | Seki | ............... | H04L 12/5601 |
| | | | | 370/395.1 |
| 2004/0215780 A1* | 10/2004 | Kawato | ............... | H04L 47/15 |
| | | | | 709/226 |
| 2005/0125515 A1* | 6/2005 | Dufour | ............... | H04L 41/0873 |
| | | | | 709/221 |
| 2008/0137672 A1* | 6/2008 | Tanimoto | ............... | H04L 12/66 |
| | | | | 370/401 |
| 2008/0219274 A1* | 9/2008 | Kato | ............... | H04L 12/4625 |
| | | | | 370/401 |
| 2009/0141635 A1* | 6/2009 | Little | ............... | H04L 43/0817 |
| | | | | 370/236.1 |
| 2009/0157984 A1* | 6/2009 | Hara | ............... | G06F 3/061 |
| | | | | 711/154 |
| 2009/0228506 A1* | 9/2009 | Wada | ............... | G06F 17/30286 |
| 2010/0115078 A1* | 5/2010 | Ishikawa | ............... | G06F 16/10 |
| | | | | 709/223 |
| 2011/0113469 A1* | 5/2011 | Takahashi | ............... | H04L 63/104 |
| | | | | 726/1 |
| 2012/0072587 A1* | 3/2012 | Nishiyama | ............... | H04L 41/0266 |
| | | | | 709/224 |
| 2014/0372601 A1* | 12/2014 | Suzuki | ............... | H04L 41/5022 |
| | | | | 709/224 |
| 2015/0363284 A1 | 12/2015 | Ishii | | |
| 2018/0199239 A1* | 7/2018 | Sabater Maroto | ............... | G06F 9/5072 |

FOREIGN PATENT DOCUMENTS

| | | |
|---|---|---|
| JP | 2002-120417 | 4/2002 |
| JP | 5747133 B1 | 7/2015 |

* cited by examiner

FIG. 4

EXAMPLES OF RESOURCE INFORMATION                    7: RESOURCE INFORMATION

CE#0 RESOURCE MANAGEMENT INFORMATION

| CM#0 STATUS | CM#1 STATUS | DE#00 IOM#0 STATUS | DE#00 IOM#1 STATUS |
|---|---|---|---|
| DE#00 DISK#0 STATUS | DE#00 DISK#0 ACCESSIBLE OR NOT | DE#00 DISK#0 STATUS | DE#00 DISK#1 ACCESSIBLE OR NOT |
| DE#00 DISK#2 STATUS | DE#00 DISK#2 ACCESSIBLE OR NOT | CONNECTION PATH#0 STATUS | CONNECTION PATH#0 CONNECTABLE OR NOT |
| CONNECTION PATH#1 STATUS | CONNECTION PATH#1 CONNECTABLE OR NOT | CONNECTION PATH#2 STATUS | CONNECTION PATH#2 CONNECTABLE OR NOT |
| ... | | | |
| COUNTER VALUE | | | |

CE#1 RESOURCE MANAGEMENT INFORMATION

| CM#2 STATUS | CM#3 STATUS | DE#10 IOM#0 STATUS | DE#10 IOM#1 STATUS |
|---|---|---|---|
| DE#10 DISK#0 STATUS | DE#10 DISK#0 ACCESSIBLE OR NOT | DE#10 DISK#0 STATUS | DE#10 DISK#1 ACCESSIBLE OR NOT |
| DE#10 DISK#2 STATUS | DE#10 DISK#2 ACCESSIBLE OR NOT | CONNECTION PATH#0 STATUS | CONNECTION PATH#0 CONNECTABLE OR NOT |
| CONNECTION PATH#1 STATUS | CONNECTION PATH#1 CONNECTABLE OR NOT | CONNECTION PATH#2 STATUS | CONNECTION PATH#2 CONNECTABLE OR NOT |
| ... | | | |
| COUNTER VALUE | | | |

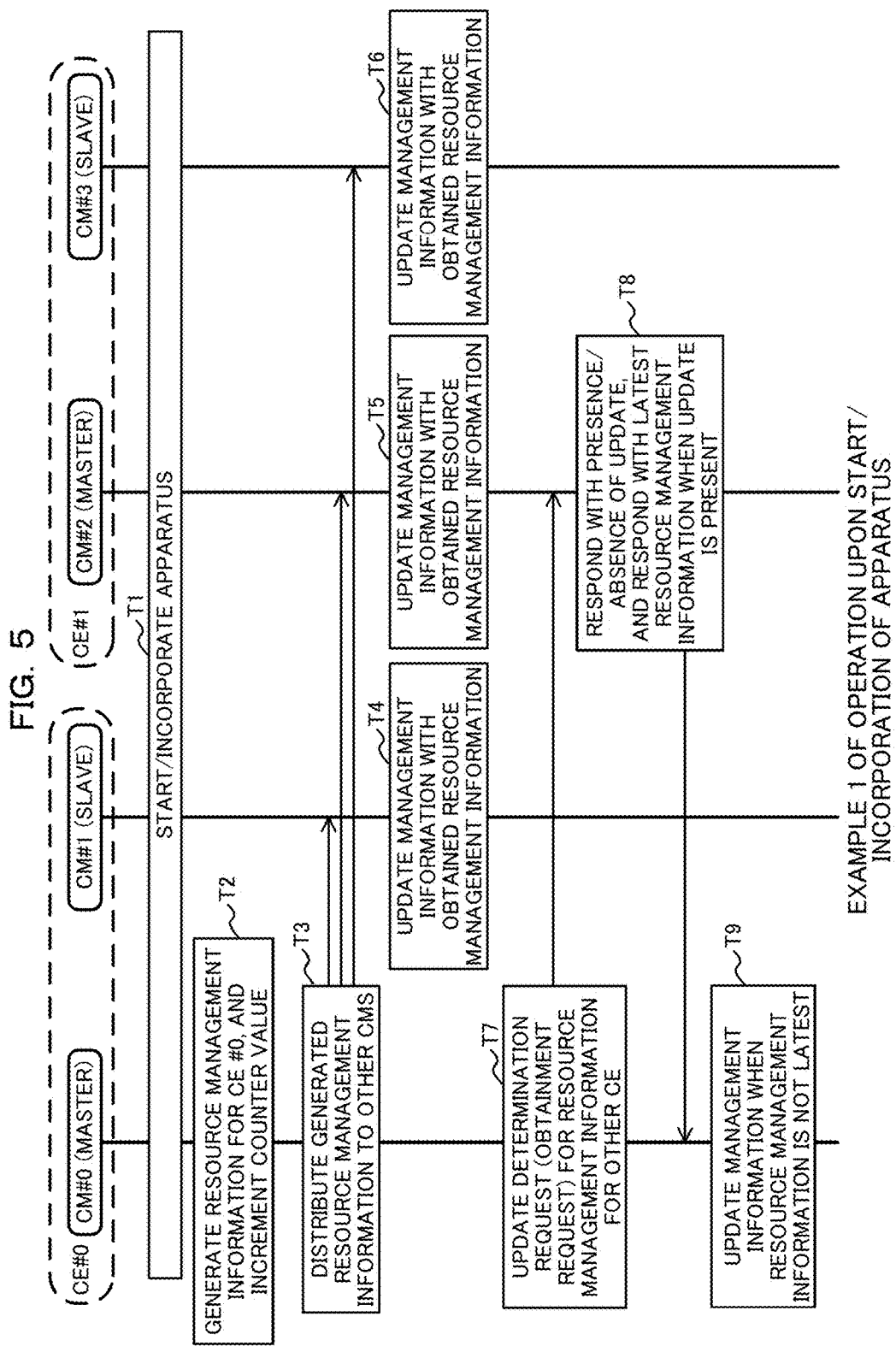

EXAMPLE 2-1 OF STATUS OF RESOURCE MANAGEMENT INFORMATION

CONTROL APPARATUS IN A PLURALITY OF CONTROL APPARATUSES FOR MANAGING MANAGEMENT INFORMATION

CROSS-REFERENCE TO RELATED APPLICATION

This application is based upon and claims the benefit of priority of the prior Japanese Patent Application No. 2015-179377, filed on Sep. 11, 2015, the entire contents of which are incorporated herein by reference.

FIELD

The embodiments discussed therein are directed to a control apparatus, an information processing system, and a computer-readable storage medium having a control program stored therein.

BACKGROUND

In recent years, in addition to increasing the storage capacities of storage apparatuses and managing data stored in storage apparatuses independently, an operating mode of storage apparatuses has gained an attention wherein multiple storage apparatuses are collectively operated as a single storage apparatus (system), for managing and manipulating data.

In order to realize such an operating mode, storage apparatuses preferably exchange information on resources managed by those storage apparatuses at regular intervals. The information to be exchanged includes, for example, the status of storage devices, information indicating whether or not the storage devices are accessible, and information indicating connection paths between the storage devices and whether or not the connection patties are connectable.

When resource management information is updated in a storage apparatus, for example, storage apparatuses can share resource management information of local and other storage apparatuses, by exchanging all resource management information including the updated information, with each other.

Patent Document 1: Japanese Laid-open Patent Publication No. 2002-120417

Patent Document 2: Japanese Registered Patent Publication No. 62-36574

There is some time delay before updated resource management information is distributed to all storage apparatuses in a system after the resource management information is updated in a storage apparatus. Depending on the timing when a storage apparatus attempts to look up the resource management information of other storage apparatuses, the old resource management information may be looked up instead. In such a case, the storage apparatus may operate based on the old resource management information that does not reflect the current configuration of the other storage apparatus, which may adversely affect the operation of the system.

One solution to prevent old resource management information from being looked up is that a storage apparatus attempting to look up resource management information of other storage apparatuses inquires whether or not the resource management information has been updated, by sending the resource management information possessed by the inquiring storage apparatus, for example. If the resource management information has been updated, the inquiring storage apparatus can obtain new resource management information from other storage apparatuses, and look up the information.

Resource management information is relatively large in size, however. Hence, if resource management information is sent every time other storage apparatuses attempt to utilize the resource management information, an increase in the communication data volume may be induced, which might induce a reduced performance of the system.

The above-described disadvantage is not limited to storage systems. For example, such a disadvantage may also be experienced in a wide variety of information processing systems wherein multiple control apparatuses share management information with each other, such as systems wherein multiple monitor apparatuses exchange monitor information about targets to be monitored.

SUMMARY

According to an aspect of the embodiments, a control apparatus in a plurality of control apparatuses provided in a system, the control apparatus served as a first control apparatus which includes a memory unit and a processor. The memory unit stores a plurality of management information managed by respective control apparatuses and a plurality of modification information indicating update statuses of respective management information. In response to receiving first modification information corresponding to first management information managed by the first control apparatus from a second control apparatus in the system, the processor compares the first modification information which is received, with first modification information stored in the memory unit. When the first modification information which is received does not match the first modification information stored in the memory unit, the processor notifies the second control apparatus of a response including information about the first management information and the first modification information stored in the memory unit, to cause the first management information and the first modification information stored in the second control apparatus, to be updated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of data structure of resource information;

FIG. 5 is a sequence chart illustrating an example of operation upon a startup or incorporation of apparatuses;

DESCRIPTION OF EMBODIMENTS

Figure 1:
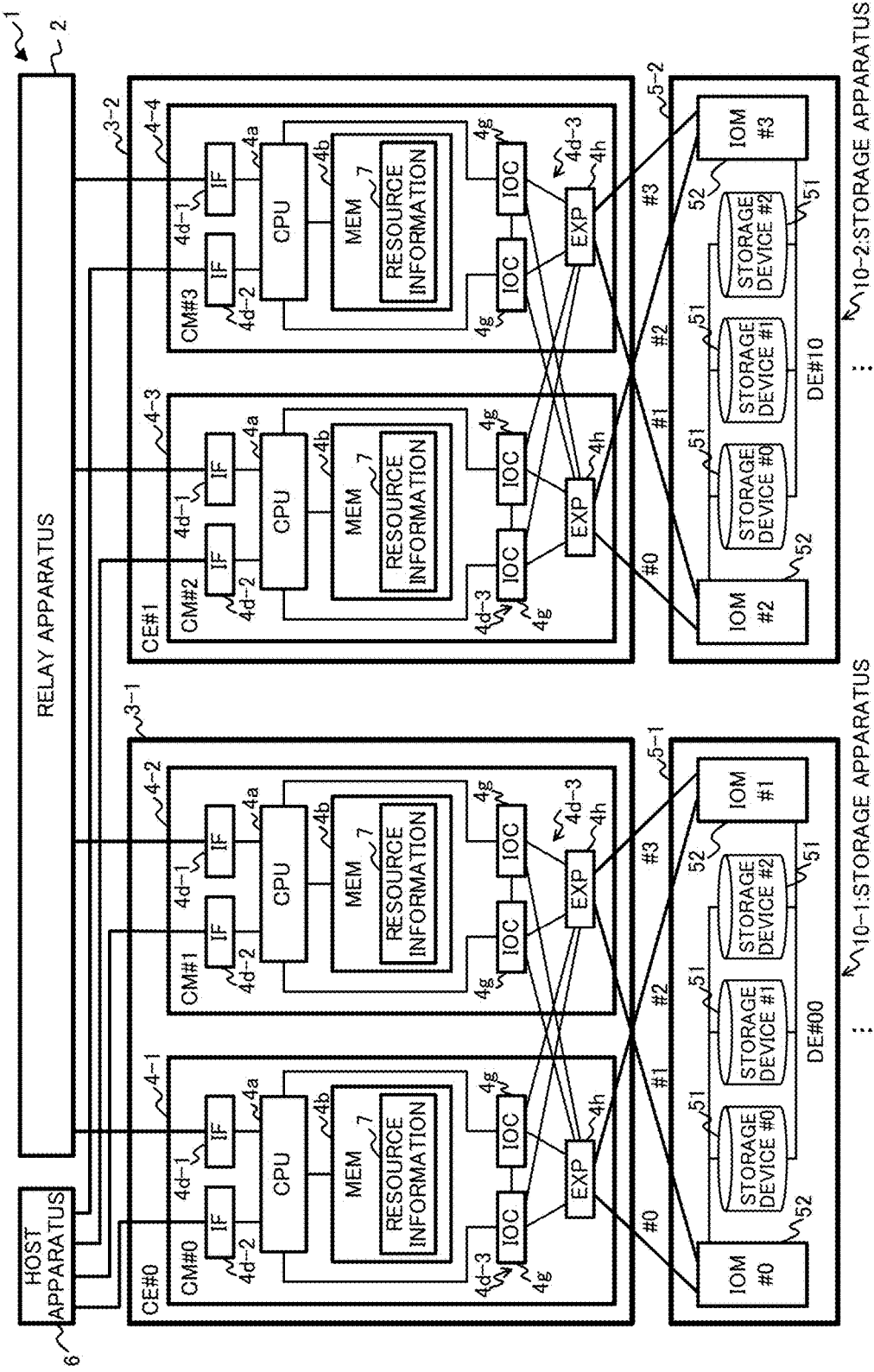
FIG. 1 is a diagram illustrating an example of a configuration of a storage system as one example of one embodiment.

Hereinafter, an embodiment of the present invention will be described with reference to the drawings. Note that the embodiment described below is merely exemplary, and it is not intended that various modifications and applications of the technique are excluded. In other words, the present embodiment may be practiced without departing from the spirit thereof. Note that elements referenced to by the like reference symbols denote the same or similar elements in the drawings used in the following embodiment, unless otherwise stated.

(1) Embodiment

(1-1) Example of Configuration of Storage System

FIG. 1 is a diagram illustrating an example of a configuration of a storage system 1 as one example of one embodiment. As depicted in FIG. 1, the storage system 1 includes a relay apparatus 2, multiple (two in FIG. 1) controller enclosures (CEs) 3-1 and 3-2, and multiple (two in FIG. 1) drive enclosures (DEs) 5-1 and 5-2, for example. In the following descriptions, when multiple devices or apparatuses are described without making any distinction among them, they may be referenced to by only reference symbols without numerals following a hyphen "-". For example, when no distinction is to be made between the CEs 3-1 and 3-2, they are referenced to as the CEs 3.

The storage system 1 includes multiple storage devices 51 provided in the DEs 5, for providing the host apparatus 6 with storage areas in the storage devices 51. The storage system 1 may store data across the multiple storage devices 51 in a distributed or redundant manner, by the Redundant Arrays of Inexpensive Disks (RAID) technique, for example. Alternatively, the CEs 3 may contain the storage devices 51.

In the example in FIG. 1, the DE 5-1 (DE #00) and the DE 5-2 (DE #10) are connected to the CE 3-1 (CE #0) and the CE 3-2 (CE #1), respectively. Hereinafter, the CE 3-1 and the DE 5-1 connected to the CE 3-1 may be collectively referred to as a storage apparatus 10-1, whereas the CE 3-2 and the DE 5-2 connected to the CE 3-2 may be collectively referred to as a storage apparatus 10-2. In one embodiment, an example will be described wherein the storage apparatuses 10-1 and 10-2 are collectively operated as a single storage apparatus (storage system 1), for managing and manipulating data.

While each CE 3 is connected to one of the DEs 5 in the example in FIG. 1, this is not limiting. Multiple DEs 5 may be connected to each CE 3 in parallel, or one or more additional DEs 5 may be connected to a DE 5 connected to a CE 3 in a cascade connection.

Each CE 3 is connected to the relay apparatus 2 and its corresponding DE 5, and represents one example of a control casing that carries out various controls. Each CE 3 may include one or more controller modules (CMs) 4. In FIG. 1, the CE 3-1 (CE #0) includes two CMs, namely, CM 4-1 (CM #0) and CM 4-2 (CM #1), whereas the CE 3-2 (CE #1) includes two CMs, namely, CM 4-3 (CM #2) and CM 4-4 (CM #3).

Each CM 4 represents one example of a control apparatus that controls access requests issued from the host apparatus 6 to the DE 5. Examples of the CMs 4 include computers, such as information processing apparatus, e.g., servers and personal computers (PCs), for example.

As exemplified in FIG. 1, each CM 4 configures a redundant configuration (e.g., is duplicated) with the other CM 4 in the CE 3. One CM 4 (CM 4-1 and 4-3 in FIG. 1) of the CMs 4 in each CE 3 functions as the master CM 4 that principally controls the storage apparatus 10, in the CE 3. The non-master CM 4 (CM 4-2 and 4-4 in FIG. 1) of the CMs 4 in the CE 3 functions as the slave CM 4 that will serve as a master when the master CM 4 fails or is detached. Which of the CMs 4 functions as the master and which of the CMs 4 functions as the slave may be determined upon a startup of the storage apparatuses 10.

The relay apparatus 2 represents one example of a relay apparatus that communicatively connects the multiple CMs 4 such that the multiple CMs 4 send and receive information to and from each other. Examples of the relay apparatus 2 include routers, such as front end routers (FRTs), for example. The relay apparatus 2 includes multiple adaptors compliant with the Peripheral Component Interconnect (PCI) Express (PCIe) standard, for example, and may be connected to each of the multiple CMs 4 through PCIe-compliant cables. The CMs 4 in different CEs 3 may communicate with each other via the relay apparatus 2, while the CMs 4 in the same CE 3 may communicate with each other through cables (e.g., SAS cables) connecting the CMs 4, for example. SAS is the abbreviation for the Serial Attached Small Computer System Interface (SCSI).

In the storage system 1, the multiple CMs 4 can control the storage system 1, or can share (synchronize) or notify information about accesses and the like to the multiple storage devices 51, by exchanging information with each other. As one example, the CMs 4 exchange resource information 7 (refer to FIG. 1) with each other, the resource information 7 that is utilized for managing resources in the storage system 1. In other words, the storage system 1 represents one example of an information processing system wherein each of multiple control apparatuses shares management information.

The CEs 3-1 and 3-2 may have similar configurations, and the CMs 4-1 through 4-4 may have similar configurations.

Hence, the CMs 4 will be described focusing on an arbitrary CM 4. The details of the CMs 4 will be described later.

Each DE 5 represents one example of an apparatus (device) that includes multiple (three in FIG. 1) storage devices 51 (storage devices #0 through #2) and carries out accesses, such as writes and reads data to and from the storage devices 51, in response to a request from the CMs 4.

Each DE 5 may also include one or more (two in FIG. 1) input/output modules (IOMs) 52, as one example of a control unit that controls accesses to the storage devices 51 in the DE 5 and makes a living confirmation to the storage devices 51. The IOMs 52 can control the DE 5 in a collective manner, and can execute processing as switch apparatuses that relay data between the CMs 4 connected to that DE 5 (e.g., the CMs 4-1 and 4-2 in the case of the DE 5-1 in FIG. 1) and the storage devices 51. Examples of such switch apparatuses include SAS expanders. The IOMs 52 may also be connected to the IOMs 52 in the other DE 5.

The storage devices 51 represent one example of hardware that stores various data, programs, and the like. Examples of the storage devices 51 include a wide variety of storage devices, such as magnetic disks, e.g., hard disk drives (HDDs), semiconductor drive devices, e.g., solid state drives (SSDs), for example.

The respective CMs 4 in each CE 3 may be connected directly or indirectly to the DE 5 related to that CE 3, for providing redundant access paths. As one example, each of the CMs 4-1 and 4-2 in the CE 3-1 may be connected to the two IOMs 52 in the DE 5-1 through cables, such as SAS cables, in FIG. 1.

The host apparatus 6 represents one example of an upper apparatus connected to the multiple CMs 4. The host apparatus 6 can issue an access request for making various accesses to the multiple DEs 5 (storage devices 51).

Although not illustrated in the example in FIG. 1, the host apparatus 6 may be connected to the multiple CMs 4 through a switch for switching paths between the host apparatus 6 and the multiple CMs 4, or through a network, such as a local area network (LAN) or the Internet.

Note that the storage system 1 is provided with a rack (not illustrated) for enclosing the relay apparatus 2, the CEs 3, and the DEs 5, for example, such that the relay apparatus 2, the CEs 3, and the DEs 5 can be mounted to or unmounted from the rack.

Hereinafter, the details of the CMs 4 in the storage system 1 will be described.

(1-2) Example of Hardware Configuration of CM

Figure 2:
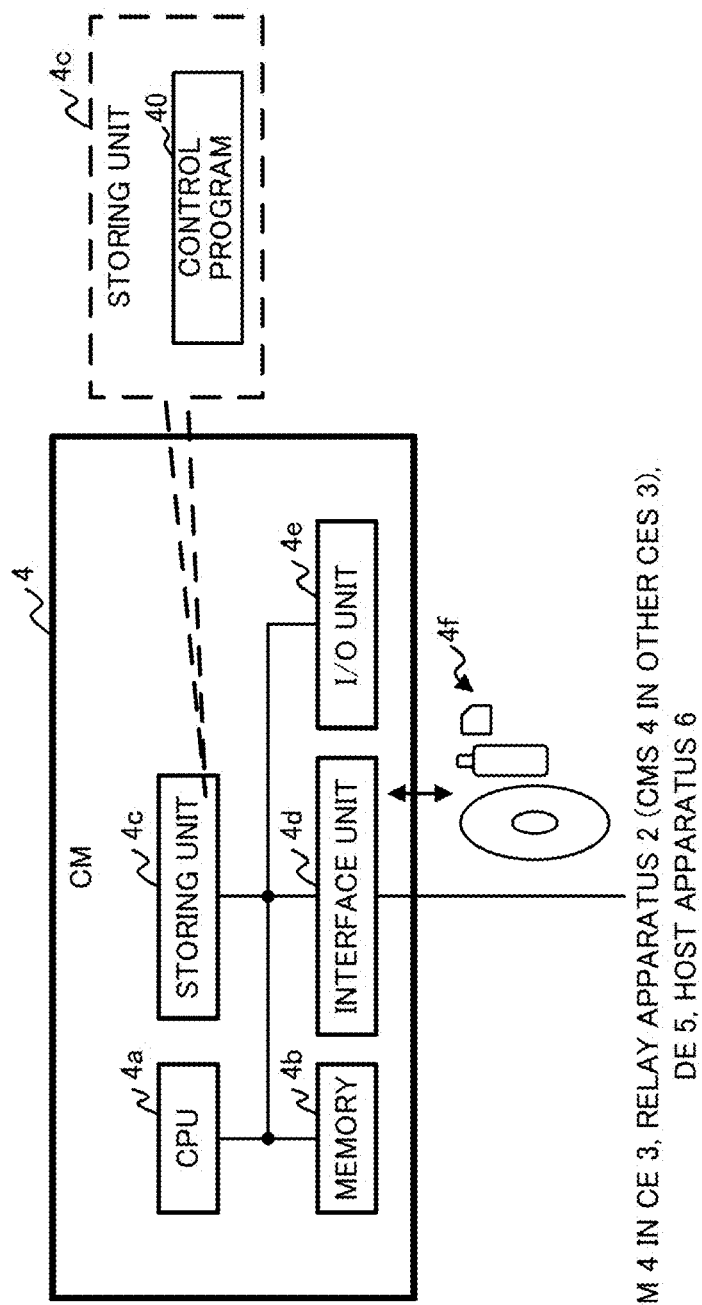
FIG. 2 is a diagram illustrating an example of a hardware configuration of a CM.

Firstly, referring to FIGS. 1 and 2, an example of a hardware configuration of one of the CMs 4 depicted in FIG. 1 will be described. FIG. 2 is a diagram illustrating an example of a hardware configuration of a CM 4. As depicted in FIG. 2, the CM 4 includes a central processing unit (CPU) 4a, a memory 4b, a storing unit 4c, an interface unit 4d, and an I/O unit 4e, for example.

The CPU 4a represents one example of a computing device (processor) that carried out various controls and computations. The CPU 4a may be communicatively connected to each block in the CM 4 through a bus. As the computing device, in place of the CPU 4a, electric circuits such as integrated circuits (ICs), e.g., micro processing units (MPUs), application specific integrated circuits (ASICs), field programmable gate arrays (FPGAs), may be used, for example.

The memory 4b represents one example of hardware that stores various data and programs. The memory 4b may include storage areas for storing resource information 7 depicted in FIG. 1, or may be also used as a cache memory that temporarily stores data or programs used for making accesses to the DEs 5. Examples of the memory 4b include a volatile memory, such as a random access memory (RAM), for example.

The storing unit 4c represents one example of hardware that stores various data, programs, and the like. Examples of the storing unit 4c include a wide variety of storage devices, such as magnetic disks, e.g., HDDs, semiconductor drive devices, e.g., SSDs, non-volatile memories, e.g., flush memories and read only memories (ROMs), for example.

For example, the storing unit 4c can store a control program 40 that embodies all or a part of functions of the CMs 4. The CPU 4a can embody the functions of the CMs 4 by loading the control program 40 stored in the storing unit 4c into the memory 4b for executing it, for example.

The interface unit 4d represents one example of a communication interface that controls connections and communications among the host apparatus 6, the DE 5, the CMs 4 in the other CE 3 (via the relay apparatus 2), the other CM 4 in the CE 3, and an operation terminal or the like used by an operator. For example, the interface unit 4d may include adaptors (ports) for connecting the IFs 4d-1 through 4d-3 depicted in FIG. 1, or the operation terminal. The control program 40 may be downloaded to the CM 4 from a network (not illustrated) through the interface unit 4d.

In the example depicted in FIG. 1, the IF 4d-1 represents one example of a communication interface that controls connections and communications with the relay apparatus 2. Examples of the IF 4d-1 include one or more non-transparent bridges (NTBs) including adaptors compliant with the PCIe or the like, for example.

The IF 4d-2 represents one example of a communication interface (host interface) that controls connections and communications with the host apparatus 6. Examples of the IF 4d-2 include one or more channel adapters (CAs) including adaptors compliant with LANs, the SAS, the Fibre Channel (FC), or InfiniBand, for example. The IF 4d-2 may be connected to the host apparatus 6 through a cable or the like compliant with such a standard.

The IF 4d-3 represents one example of a communication interface that controls connections and communications with the DE 5 (the storage devices 51). The IF 4d-3 may include multiple (two in the example in FIG. 1) IOCs 4g and an expander (EXP) 4h, for example.

Each IOC 4g represents one example of an I/O control unit that controls accesses (I/Os) to the DE 5. The EXP 4h represents one example of a module for increasing the number of devices that can be connected to the CM 4 (through SAS connections, for example). The EXP 4h may be connected to the DE 5 through SAS-compliant cables or the like. In the example in FIG. 1, the multiple IOCs 4g are connected to the EXP 4h in the local CM 4 and to the EXP 4h in the other CM 4 in the CE 3, and the EXPs 4h are connected to the IOMs 52 in the DE 5 related to that CE 3.

Referring back to FIG. 2, the interface unit 4d may include a reader unit that reads data or programs stored in a storage medium 4f. The reader unit may include a connection terminal or a device, to which the computer-readable storage medium 4f can be connected or inserted. Examples of the reader unit include an adaptor compliant with the Universal Serial Bus (USB) or the like, a drive device for accessing a storage disk, a card reader for accessing a flush memory (e.g., an SD card), for example. The storage medium 4f may include the control program 40 stored therein.

The I/O unit 4e may include at least some of an input unit (e.g., a mouse, a keyboard, operation buttons) and an output unit (e.g., a display). For example, the input unit may be used by a user or operator for establishing or modifying settings, making an operation, such as mode selections (switches), on the system, or entering data. The output unit may be used by the operator or the other user, for checking the settings, or for outputting various notifications.

The hardware configuration of the CM 4 described above is merely exemplary. Any hardware components may be added to or omitted from the other CM 4 in the CE 3, or in that CM 4 (e.g., any blocks may be added or omitted), the hardware may be divided or combined into any combinations, or any buses may be added or omitted, where appropriate.

(1-3) Example of Functional Configuration of CM

Figure 3:
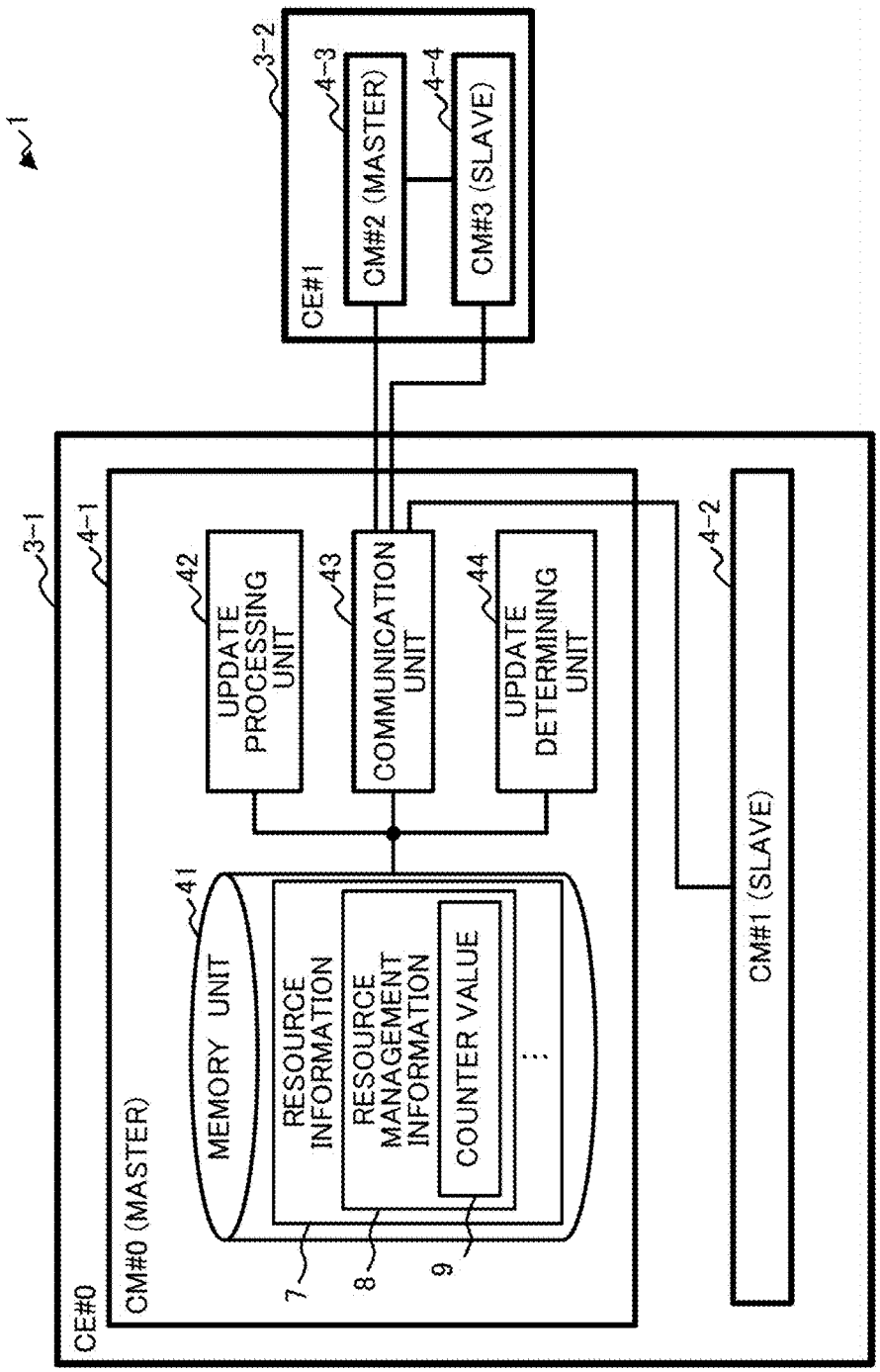
FIG. 3 is a diagram illustrating an example of a functional configuration of a CM.

Next, referring to FIG. 3, an example of a functional configuration of a CM 4 in accordance with one embodiment will be described. FIG. 3 is a diagram illustrating an example of a functional configuration of one of the CMs 4 depicted in FIG. 1. In the example in FIG. 3, some of elements or cables in the storage system 1 depicted in FIG. 1 are omitted.

As depicted in FIG. 3, the CM 4 includes a memory unit 41, an update processing unit 42, a communication unit 43, and an update determining unit 44, for example. While an example of a functional configuration of the CM 4-1 serving as the master CM 4 in the CE 3-1, is depicted in the example in FIG. 3, the CM 4-2 serving as the slave CM 4, the CMs 4-3 and 4-4 in the other CE 3-2 may have function configurations similar to that of the CM 4-1.

The memory unit 41 includes storage areas for storing information of resource information 7, and may be embodied by at least a part of the storage areas in the memory 4b depicted in FIG. 2, for example.

The resource information 7 includes resource management information 8a and 8b for managing resources of the storage apparatuses 10-1 and 10-2 configuring the storage system 1, as exemplified in FIGS. 3 and 4. In the following descriptions, when no distinction is to be made between the resource management information 8a and 8b, they are simply referred to as the resource management information 8.

The resource management information 8a and 8b is an example of information about resources that managed by the CE 3-1 (CE #0) and the CE 3-2 (CE #1), and is managed by the CMs 4 in the corresponding CEs 3. Each of the multiple CMs 4-1 through 4-4 in the storage system 1 stores resource information 7 including resource management information 8a and 8b, and can control the storage system 1 (the CEs 3) by updating and looking up the information. The resource management information 8 possessed by each CM 4 has the same data structure, and is managed in the similar manner.

As depicted in FIG. 4, the resource management information 8 includes the fields "CM#x status" indicating the status of each CM 4 in the respective CEs 3, and the fields "DE#y IOM#i status" indicating the status of each IOM 52 in the DEs 5 corresponding to the respective CEs 3, for example. The resource management information 8 also includes the status of each storage device 51 in the DE 5 corresponding to the respective CEs 3, namely, the fields "DE#y Disk#j status" and "DE#y Disk#j Accessible or not", indicating the status of each disk and whether that disk is accessible or not. The resource management information 8 further includes the status of each access path, namely, the fields "Connection path#z status" and "Connection path#z Connectable or not", indicating the status of each connection path and whether that connection path in the CE 3 is connectable or not. The connection paths are the Paths #0 through #3 in FIG. 1, between the CMs 4 and the DEs 5, for example. Here, the variables 'x', 'y' 'z', 'i', and 'j' in the above field names take arbitrary values specifying devices or paths in the CEs 3 (refer to FIG. 1).

The statuses of the CMs 4 take one of the following values: '0' indicating "Suspended", "1" indicating "Operating", and "2" indicating "Failed", for example. The statuses similar to those of the CMs 4 may be set to the statuses of the IOMs 52 and the statuses of the storage devices 51 in the DEs 5. The statuses of the connection paths take one of the following values: '0' indicating "Online" and "1" indicating "Offline (Disconnected)", for example. The information indicating whether the storage devices 51 are accessible or not and the information indicating whether the connection paths are connectable or not take one of the following values: '0' indicating "Accessible" or "Connectable", and "1" indicating "Not accessible" or "Not connectable", for example.

The resource management information 8 in accordance with one embodiment includes counter values 9, in addition to the information described above. The counter value 9 is information provided for each resource management information 8 (i.e., for each CE 3), and represents one example of information indicating a modification to the resource management information 8. Hereinafter, the counter value 9 corresponding to the resource management information 8a may be referred to as a counter value 9a, whereas the counter value 9 corresponding to the resource management information 8b may be referred to as a counter value 9b.

While the counter values 9 are included in the respective resource management information 8 in FIG. 4, this is not limiting. For example, the counter values 9 may be maintained separately from the resource management information 8. As one example, the counter values 9 may be stored in storage areas in the memory unit 41, which are different from storage areas for the resource management information 8, or may be stored in registers or the like provided in the CMs 4. In the following descriptions, as depicted in FIG. 4, it is assumed that the counter values 9 are included in the resource management information 8.

As set forth above, the multiple resource management information 8 included in the resource information 7 is one example of a plurality of management information managed by the multiple CMs 4, and the counter value 9 corresponding to the resource management information 8 represents one example of a plurality of modification information indicating update statuses of respective management information. Further, the memory unit 41 represents one example of a memory unit that stores the multiple resource management information 8 and the multiple counter values 9.

In one embodiment, the resource management information 8 is a minimum unit of the resource information 7 for updating the resource information 7. In other words, when each CM 4 updates the resource management information 8 for the CE 3 including that CM 4 or when updated resource management information 8 for the other CE 3 is obtained from a CM 4 in the other CE 3, that CM 4 can update its resource information 7 to its latest version, by overwriting the resource management information 8 for the update.

The update processing unit 42 updates the resource information 7. There are two types of updates of the resource information 7 by the update processing unit 42: an update of the resource management information 8 corresponding to the local CE 3; and an update of the resource management information 8 corresponding to the other CE 3 based on information obtained from a CM 4 in the other CE 3.

For example, for updating the resource management information 8 corresponding to the local CE 3, the update processing unit 42 may update the resource information 7 by modifying the counter value 9 in the resource management information 8 upon updating at least a part of the resource management information 8 for the local CE 3. As one example, in response to a change in a status of a resource managed in the CE 3-1, the update processing unit 42 in the CE 3-1 updates the resource management information 8a for the CE 3-1, and increments the counter value 9a (e.g., increments the counter value 9a by one). The initial value of the counter value 9 in the initial state of the CEs 3 (immediately after power-on) is '0', for example.

In contrast, for updating the resource management information 8 corresponding to the other CE 3 based on information obtained from a CM 4 in the other CE 3, the update processing unit 42 may update the resource information 7, based on information obtained by the communication unit 43 from the CM 4 in the other CE 3. For example, the update processing unit 42 overwrites the resource management information 8 stored in the local CM 4, with the resource management information 8 including the counter value 9 obtained by the communication unit 43. In other words, the update processing unit 42 represents one example of a modifying unit that modifies the counter value 9 in response to a modification to the resource management information 8.

As described above, the respective resource management information 8 is updated in different timing, and the counter values 9 in the resource management information 8 managed by the CMs 4 in the different CEs 3 are updated in different timing, in the CMs 4 in the different CEs 3.

The communication unit 43 communicates information about the resource information 7 to and from the other CMs 4. As one example, such communications by the communication unit 43 include an inquiry as to whether or not the resource management information 8 managed by the other CE 3, which is possessed by the local CM 4, has been updated; a response to an inquiry from another CM 4; a distribution of the resource management information 8 managed by the local CE 3 to the other CMs 4; and an obtainment of the resource management information 8 managed by the CE 3 of another CM 4 distributed from that CM 4.

As one example, for making an inquiry as to whether or not the resource management information 8 for the other CE 3 has been updated, the communication unit 43 sends the counter value 9 in the resource management information 8 for the other CE 3 possessed by the local CM 4, to the other CE 3.

Further, as another example, for making a response to an inquiry from another CM 4, the communication unit 43 makes the response according to a result of the determination for the inquiry by the update determining unit 44.

Further, as another example, for a distribution of the resource management information 8, when there is a change in a resource managed by the local CE 3, in other words, the resource management information 8 is updated by the update processing unit 42, the communication unit 43 distributes the resource management information 8 including the counter value 9, to the other CMs 4.

Note that a distribution and an obtainment of the resource management information 8 can be achieved by a wide variety of known techniques. For example, a distribution and an obtainment of the resource management information 8 may be achieved by a direct memory access (DMA). As one example, for a distribution of the resource management information 8, the communication unit 43 may notify a destination CM 4 of information, such as the address in the memory unit 41 (e.g., the memory 4b), which stores the resource management information 8 to be distributed, for example. For an obtainment of the resource management information 8, a DMA may be made on the address in the memory unit 41, notified from another CM 4, thereby obtaining the resource management information 8 distributed from the other CM 4.

Alternatively, each CM 4 may be informed of a storage address of the resource management information 8 in a destination CM 4 in advance or upon a distribution. Then, for distributing the resource management information 8, the communication unit 43 may write the resource management information 8 to be distributed, into the address in the destination CM 4 by a DMA.

The update determining unit 44 determines whether or not the resource information 7 has been updated. There are two types of determinations: a determination as to whether or not the resource management information 8 for the local CE 3 has been updated in response to an inquiry from another CM 4; and a determination as to whether or not the resource management information 8 for the other CE 3 has been updated.

As one example, for making a determination as to whether or not the resource management information 8 for the local CE 3 has been updated, the update determining unit 44 compares the counter value 9 included in an inquiry from another CM 4, with the counter value 9 in the resource management information 8 for the local CE 3 stored in the local CM 4. When the two counter values 9 match (there is no difference as a result of the comparison), the update determining unit 44 causes the communication unit 43 to make a response indicating that the resource management information 8 stored in the local CM 4 has not been updated. Such a response indicating that the resource management information 8 has not been updated includes information indicating no update (e.g., a value of '0'), for example. In contrast, the two counter values 9 do not match (there is a difference as the result of the comparison), the update determining unit 44 causes the communication unit 43 to response with information of the resource management information 8 for the local CE 3 (e.g., the storage address thereof), for example.

Further, as another example, for utilizing the resource management information 8 for the other CE 3, the update determining unit 44 makes an inquiry to a CM 4 in the CE 3 that manages resources in the resource management information 8, based on the counter value 9 in the resource management information 8. The update determining unit 44 then determines whether or not the resource management information 8 has been updated, based on the response result.

For example, for utilizing the resource management information 8 of resources managed by the other CE 3, in order to check whether or not the resource management information 8 is the latest, the update determining unit 44 notifies the other CE 3 of the counter value 9 in the resource management information 8 via the communication unit 43. When the response result from the other CE 3 indicates no update (indicates that the counter values 9 match), the update determining unit 44 then determines that the resource management information 8 possessed by the local CM 4 is the latest. In this case, the update processing unit 42 suppresses the resource management information 8 from being updated, and that CM 4 utilizes the resource management information 8.

In contrast, when the response result from the other CE 3 contains information of the latest resource management information 8 (e.g., the storage address thereof), the update determining unit 44 determines that the resource management information 8 possessed by the local CM 4 is not the latest. In this case, the update determining unit 44 notifies the communication unit 43 of the received address, for obtaining the latest resource management information 8.

There are several cases where the response result contains information of the latest resource management information 8, in other words, where the update determining unit 44 in the other CM 4 determines that the two counter values 9 do not match. For example, one of such cases is that, after the resource management information 8 is updated in the CE 3 of the other CM 4, the resource management information 8 (before distribution) is looked up in the local CM 4 before the resource management information 8 is distributed (obtained).

A CM 4 utilizes the resource management information 8 for the other CE 3 in several cases. Such cases include, for example, where the CM 4 controls accesses to the DE 5 connected to the other CE 3 for balancing the load, and where a CM 4 that functions as the master for managing the entire storage system 1, attempts to know the statuses of the resources in the entire storage system 1.

As set forth above, the update determining unit 44 represents one example of a comparison unit that, in response to receiving, from another CM 4, the counter value 9 corresponding to the resource management information 8 managed by the local CM 4, compares the counter value 9 which is received, with the counter value 9 stored in the memory unit 41.

The communication unit 43 represents one example of a notification unit that, when the received counter value 9 and the counter value 9 stored in the memory unit 41 do not match in the comparison by the update determining unit 44, notifies the other CMs 4 of a response including information about the resource management information 8 and the counter value 9 stored in the memory unit 41, to cause the resource management information 8 and the counter value 9 stored in the other CMs 4 to be updated. The communication unit 43 as an example of the notification unit can suppress the response from being sent, when the received counter value 9 and the counter value 9 stored in the memory unit 41 match.

(1-4) Example of Operation of Storage System

Next, an example of an operation of the storage system 1 configured as set forth above will be described, referring to various patterns of distributing resource management information 8 in the storage system 1. In the following descriptions, it is assumed that the latest resource management information 8 for each CE 3 is possessed by the master CM 4 in that CE 3. For example, as depicted in FIG. 1, the latest resource management information 8a for the CE 3-1 (CE #0) is possessed by the master CM 4-1 (CM #0), whereas the latest resource management information 8b for the CE 3-2 (CE #1) is possessed by the master CM 4-3 (CM #2).

(1-4-1) Example 1 of Operation Upon Startup or Incorporation of Storage Apparatuses Initially, referring to FIGS. 5-11 and 27-30, an example of operation in the master CMs 4 upon a startup or incorporation of the storage apparatuses 10 will be described.

While processing by the master CM #0 in the CE #0 will be described hereinafter, similar processing may be carried out by the master CM 4 (e.g., the CM #2) in the other CE 3 (e.g., the CE #1).

Figure 6:
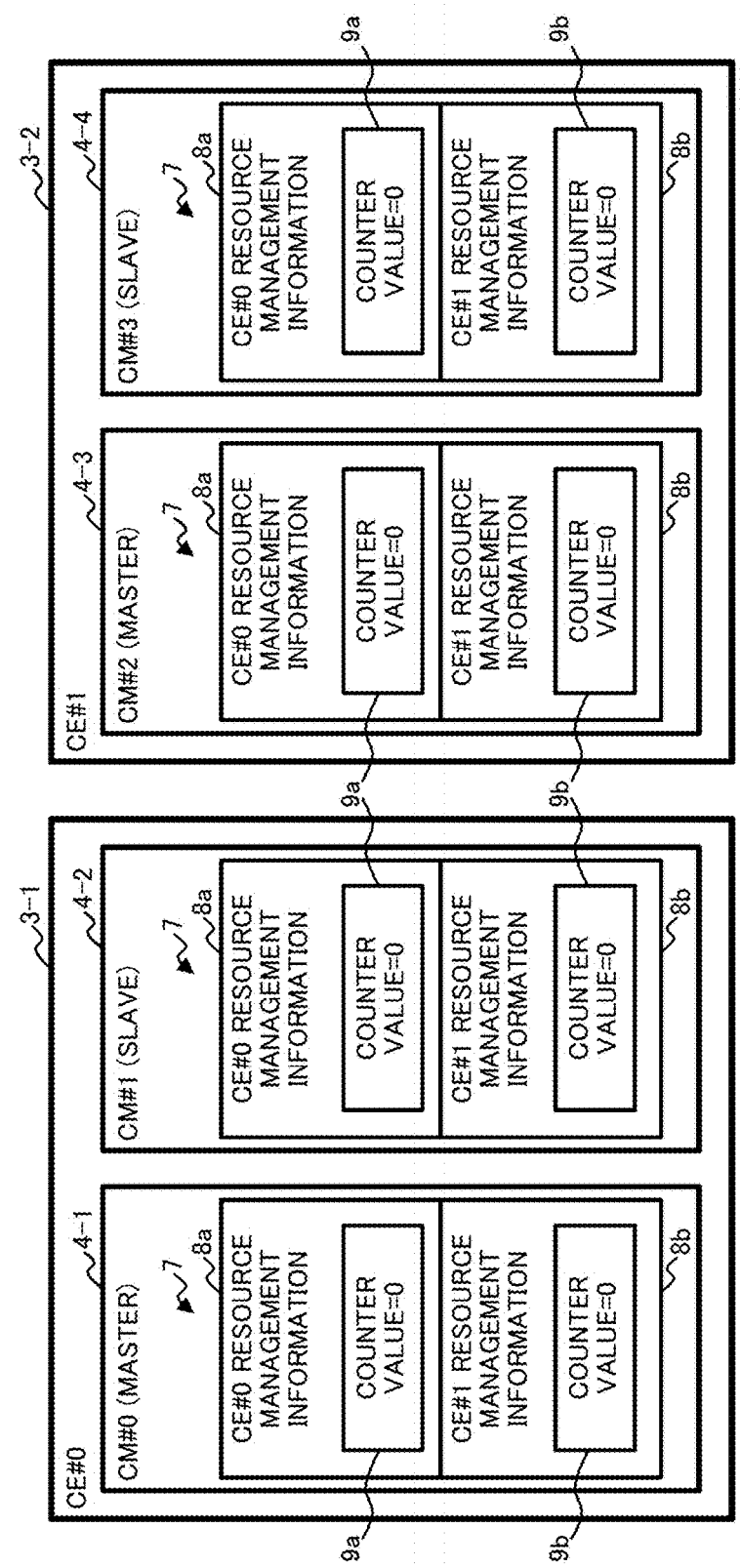
FIGS. 6-11 are diagrams illustrating an example of the state of the resource management information in the illustration in FIG. 5.

Initially, as depicted in FIG. 5, the storage apparatuses 10 are started or incorporated (processing T1). At this time, as depicted in FIG. 6, resource management information 8 possessed by each CM 4 is empty, and counter values 9 have been initialized to their initial values (e.g., '0').

Figure 7:
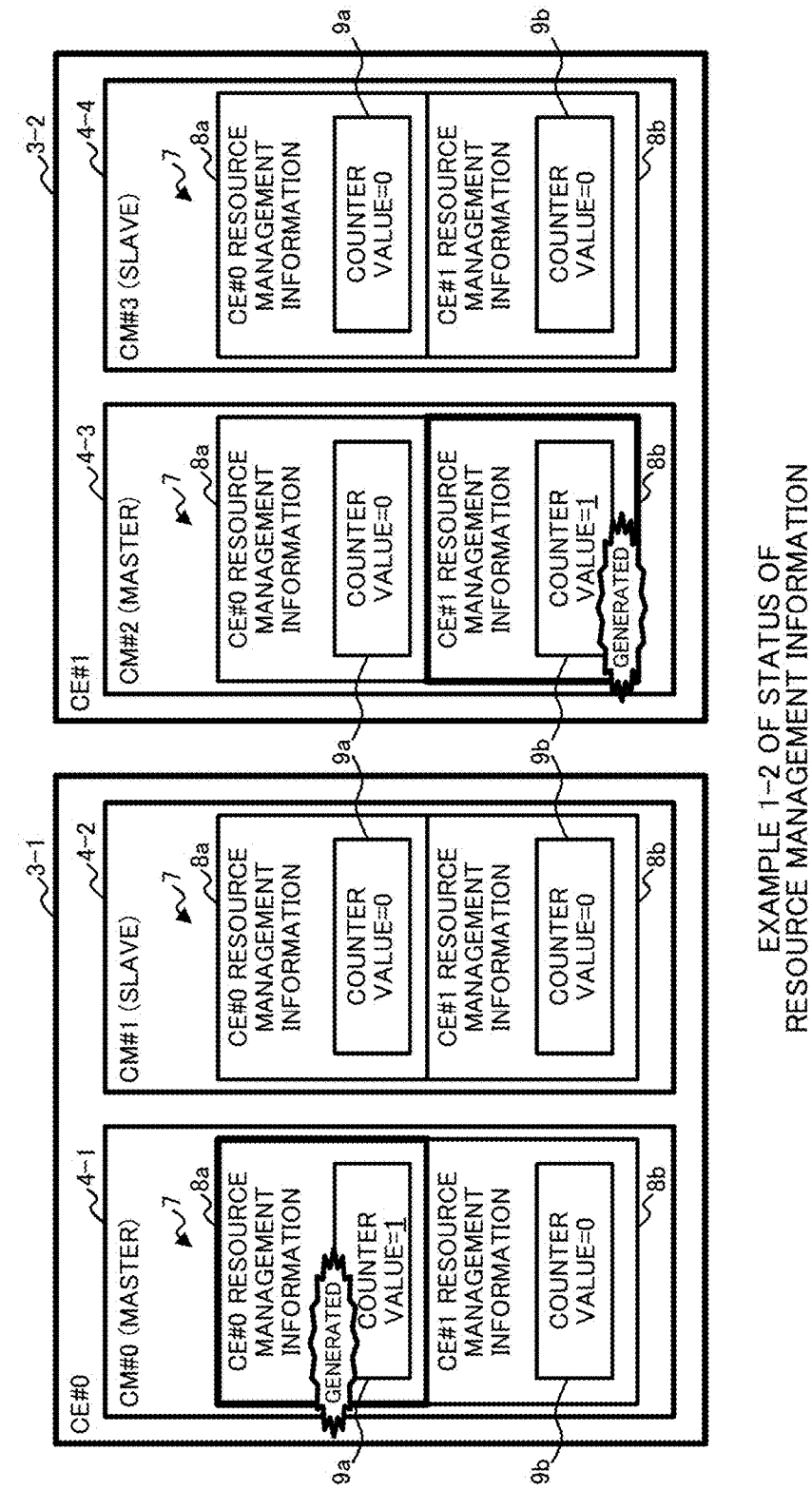

Subsequently, the update processing unit 42 in the master CM #0 collects information in the local CE #0, generates resource management information 8a, and increments the counter value 9a (processing T2). Here, as depicted in FIG. 7, the counter value 9a in the resource management information 8a in the master CM #0 is updated to "1". The status of the resource management information 8 after similar processing is carried out in the master CM #2 is also depicted in FIG. 7. This also applies to FIGS. 8-11.

Figure 8:
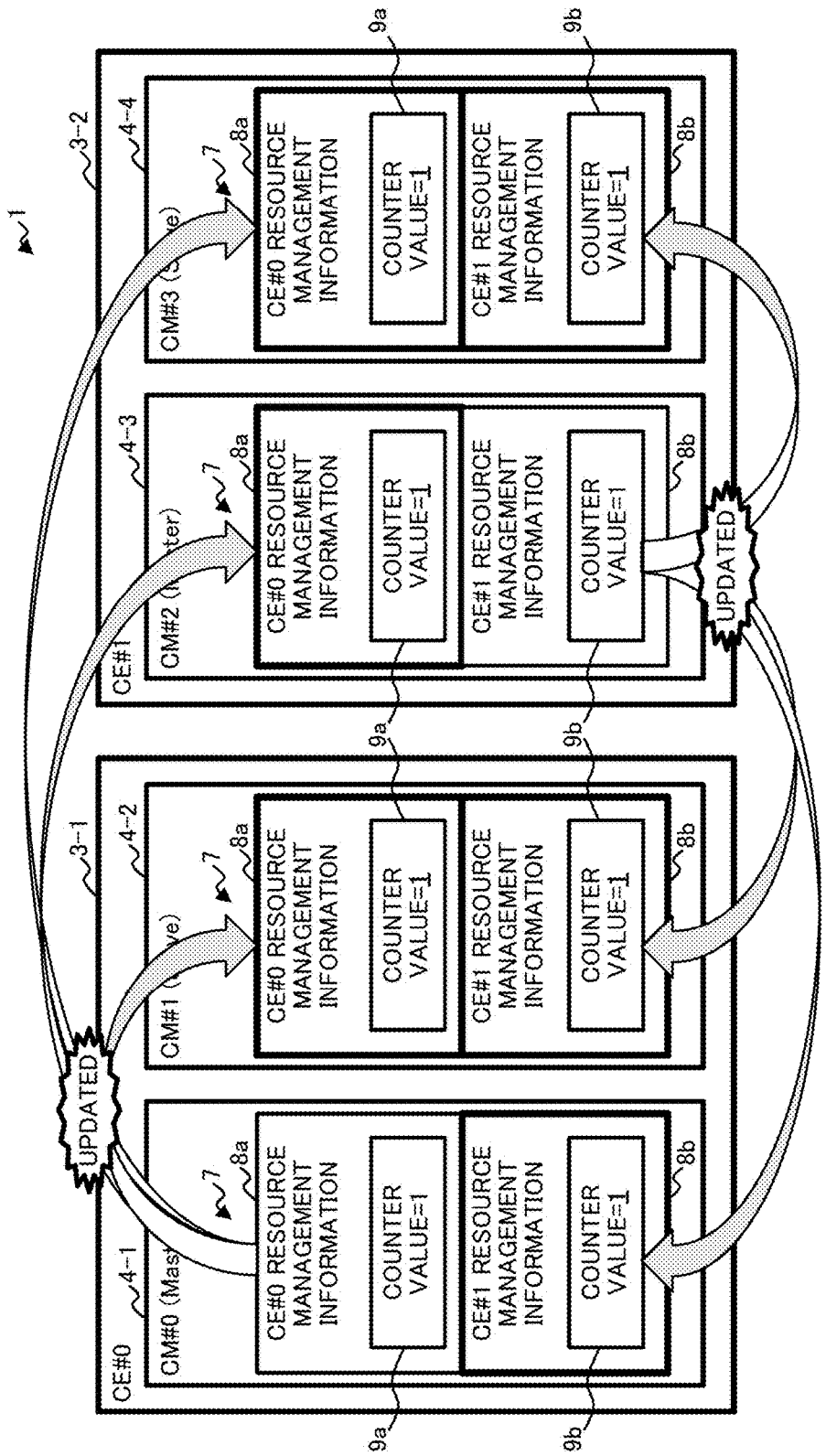
Figure 9:
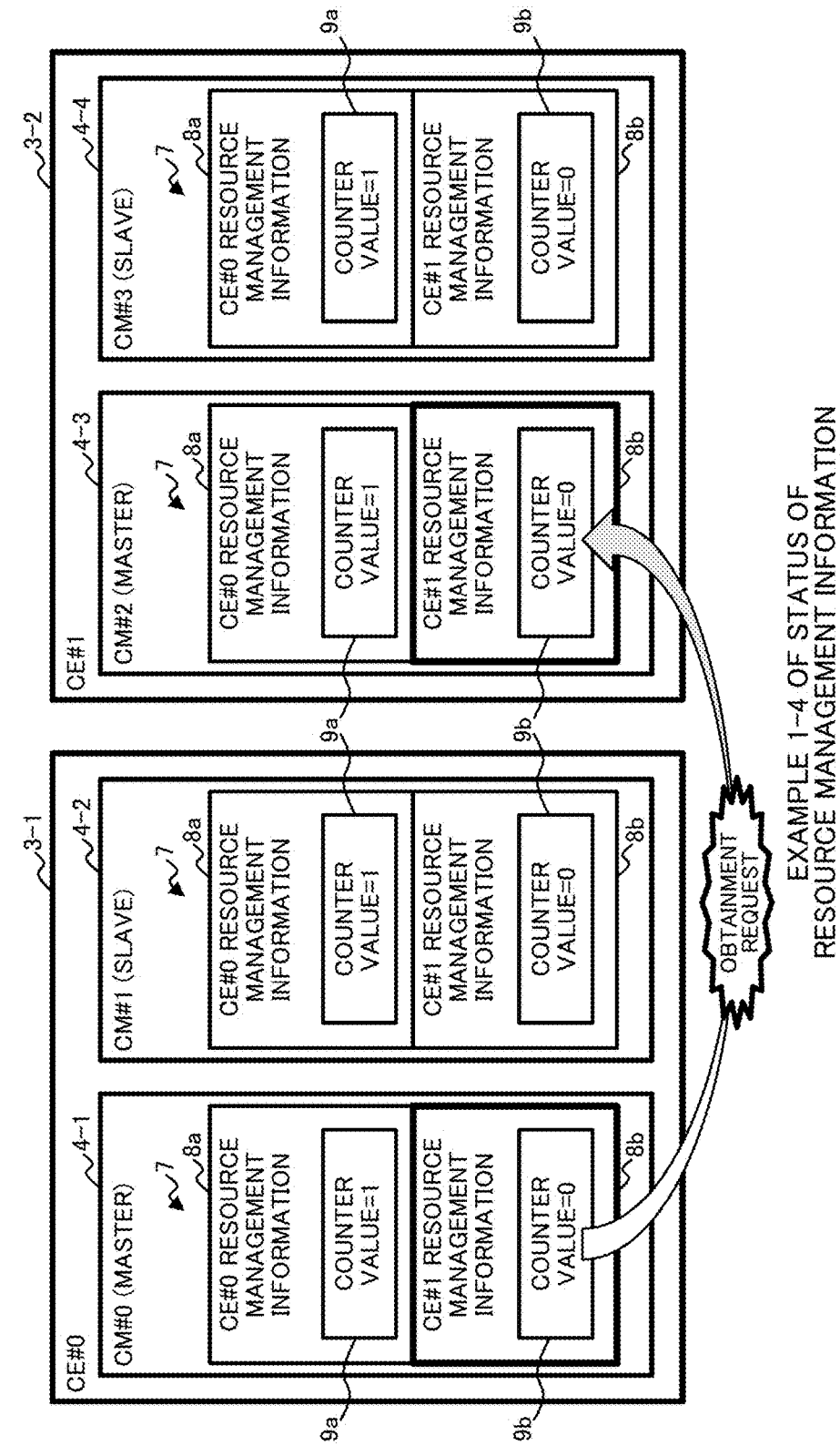
Figure 10:
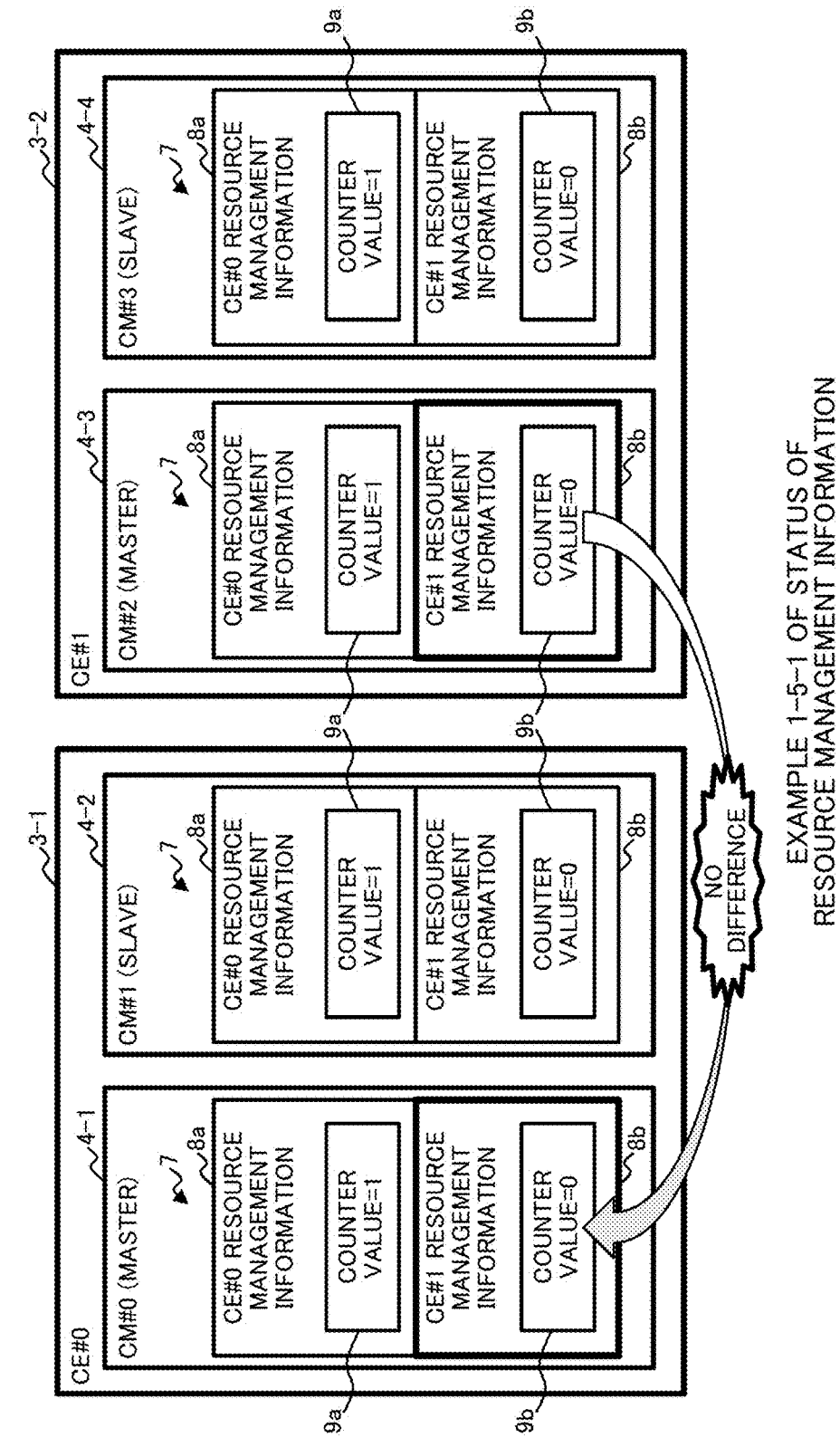
Figure 11:
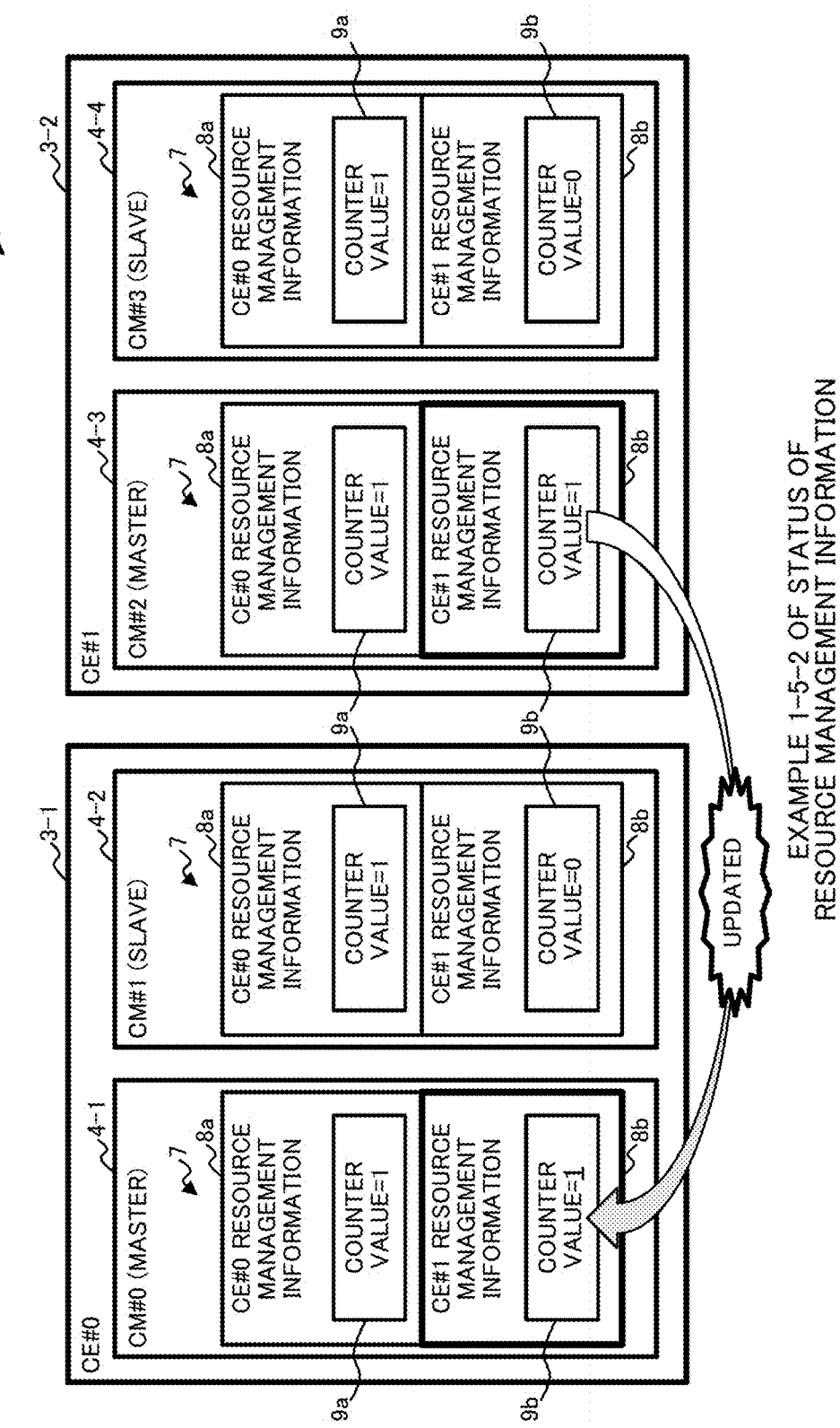
Figure 27:
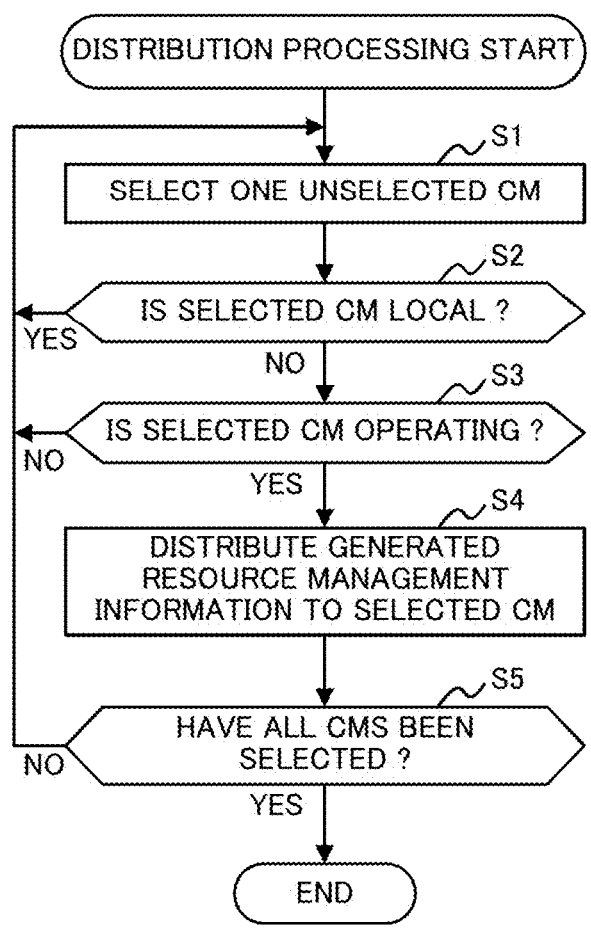
FIG. 27 is a flowchart illustrating an example of operation of distribution processing of resource management information.

The communication unit 43 in the master CM #0 then distributes the generated resource management information 8a including the counter value 9a, to the other CMs 4, e.g., the CM 1#1 through the CM #3 (processing T3; refer to FIG. 27). Each update processing unit 42 in the other CMs 4 updates the resource management information 8a possessed by that CM 4, with the obtained resource management information 8a (processing T4-T6). Similarly, in the master CM #2, similar processing is carried out on resource management information 8b, and resource information 7 used to complete the startup of the storage apparatuses 10 is prepared in each CM 4, as depicted in FIG. 8.

Here, the distribution processing of the resource management information 8 in processing T3 will be described. In the distribution processing, as depicted in FIG. 27, the communication unit 43 selects one unselected CM 4 from all of the CMs 4 in the storage system 1 (Step S1), and determines whether or not the selected CM 4 is the local CM 4 (Step S2). When the selected CM 4 is the local CM 4 (the Yes route from Step S2), the processing transitions to Step S1.

In contrast, when the selected CM 4 is not the local CM 4 (the No route from Step S2), the communication unit 43 determines whether or not the selected CM 4 is operating (Step S3). Note that this determination can be made by a wide variety of know techniques, such as looking up the resource management information 8 for the selected CM 4 or polling (e.g., making a living confirmation to) that CM 4, and detailed description therefor will be omitted.

When the selected CM 4 is not operating (the No route from Step S3), the processing transitions to Step S1. In contrast, when the selected CM 4 is operating (the Yes route from Step S3), the communication unit 43 distributes the resource management information 8 for the local CE 3 generated by the update processing unit 42, to the selected CM 4 (Step S4). Note that this distribution can be made by sending information (e.g., the storage address) of the resource management information 8, to the selected CM 4, such that the selected CM 4 can make a DMA to that storage address, for example.

Subsequently, the communication unit 43 determines whether or not all of the CMs 4 have been selected (Step S5). When there is any unselected CM 4 (the No route from Step S5), the processing transitions to Step S1. In contrast, when all of the CMs 4 have been selected (the Yes route from Step S5), the distribution processing ends.

Referring back to FIG. 5, if the generation or distribution of the resource management information 8b by the master CM #2 is delayed, the update determining unit 44 in the master CM #0 may determine that the counter value 9b in the resource management information 8b for the other CE #1 has an initial value of '0' and that the resource management information 8b has not been obtained yet. In this case, the communication unit 43 in the master CM #0 sends an update determination request, i.e., an obtainment request for the latest resource management information 8b, to the master CM #2 possessing the resource management information 8b, via the communication unit 43 (processing T7; refer to FIG. 9). Note that this obtainment request includes the counter value 9b ('0', in this case) for the resource management information 8b.

The update determining unit 44 in the master CM #0 may cause the communication unit 43 to issue an obtainment request, even when the counter value 9b in the resource management information 8b for the other CE #1 is not the initial value in the processing T7.

Figure 28:
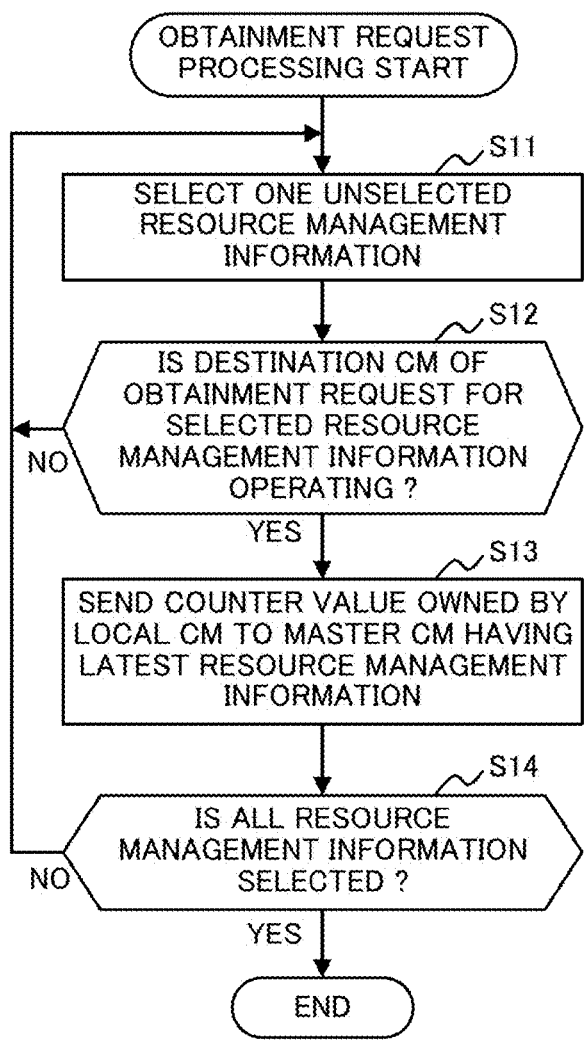
FIG. 28 is a flowchart illustrating an example of operation of obtainment request processing of resource management information.

Here, the obtainment request processing for the resource management information 8 in the processing T7 will be described. In the obtainment request processing, as depicted in FIG. 28, the communication unit 43 selects one of unselected resource management information 8 from all resource management information 8 (Step S11), and determines whether or not the master CM 4 (i.e., the destination CM 4 of an obtainment request) managing the selected resource management information 8, is operating (Step S12).

When the obtainment request destination CM 4 is not operating (the No route from Step S12), the processing transitions to Step S11. In contrast, when the obtainment request destination CM 4 is operating (the Yes route from Step S12), the communication unit 43 sends the counter value 9 in the obtainment target resource management information 8 possessed by the local CM 4, to the obtainment request destination CM 4 possessing the latest resource management information 8 (Step S13).

Subsequently, the communication unit 43 determines whether or not all resource management information 8 has been selected (Step S14). When there is any unselected resource management information 8 (the No route from Step S14), the processing transitions to Step S11. In contrast, when all resource management information 8 has been selected (the Yes route from Step S14), the obtainment request processing ends.

Figure 29:
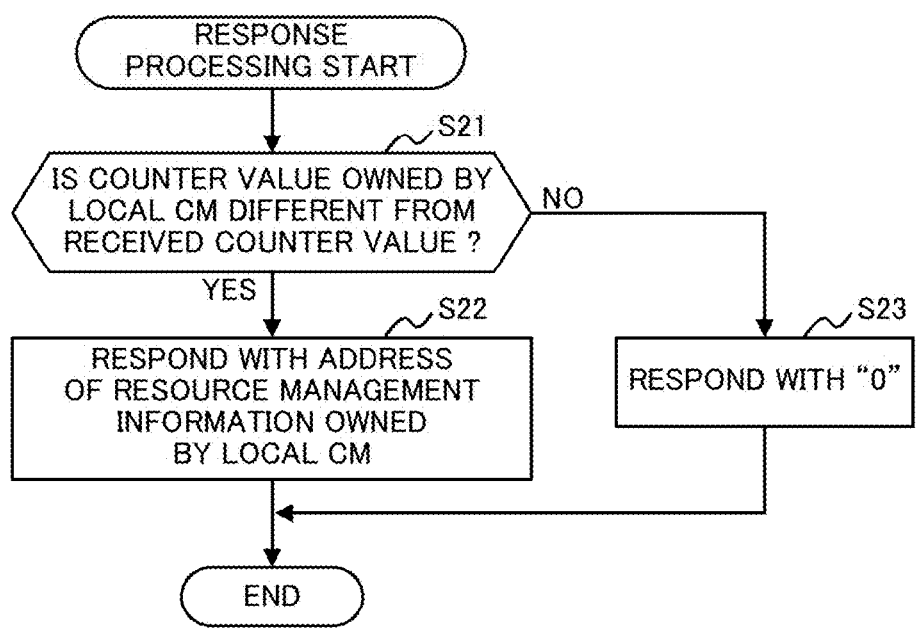
FIG. 29 is a flowchart illustrating an example of operation of response processing to an obtainment request demand.

Referring back to FIG. 5, in response to receiving the obtainment request from the master CM #0, the master CM #2 executes response processing based on the obtainment request, as exemplified in FIG. 29 (processing T8).

In the response processing in the processing T8, as depicted in FIG. 29, the update determining unit 44 in the master CM #2 compares the counter value 9b included in the obtainment request, with the counter value 9b in the resource management information 8b possessed by the local CM 4, to determine whether or not the two counter values 9b are different (Step S21). When the two counter values 9b are different in the comparison (the Yes route from Step S21), the update determining unit 44 causes the communication unit 43 to respond with information of the latest resource management information 8b possessed by the local CM 4, e.g., a storage address (Step S22) and the response processing ends.

In contrast, when the two counter values 9b are not different (the No route from Step S21), the update determining unit 44 causes the communication unit 43 to respond that the resource management information 8b has not been updated, e.g., to respond with a value of '0', (Step S23) and the response processing ends. Note that, in this case, resource management information 8b has not been generated yet or is being generated. Thus, once the resource management information 8b is generated in the master CM #2, the latest resource management information 8b is distributed in processing similar to the processing T3-T6.

Figure 30:
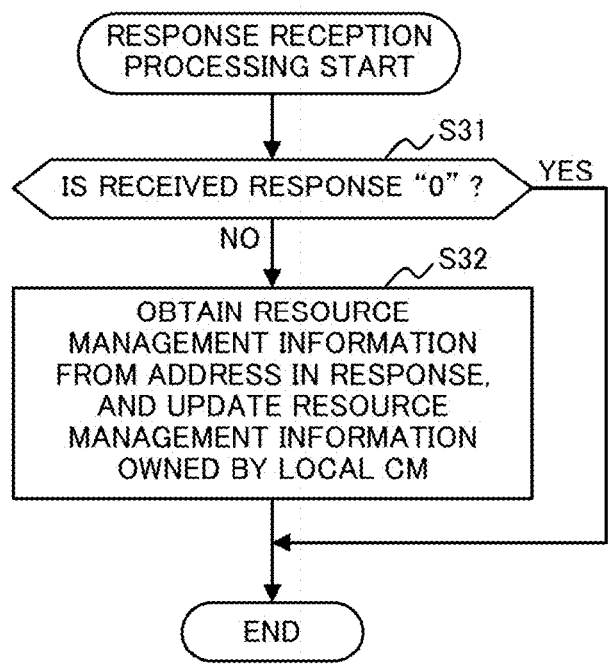
FIG. 30 is a flowchart illustrating an example of operation of response reception processing.

Referring back to FIG. 5, the master CM #0 executes response reception processing exemplified in FIG. 30, based on the response result from the master CM #2 (processing T9).

In the response reception processing in the processing T9, as depicted in FIG. 30, the update determining unit 44 in the master CM #0 determines whether or not the received response is '0', in other words, the resource management information 8b is the latest (Step S31). When the received response is not '0', in other words, the resource management information 8b is not the latest (the No route from Step S31), the latest resource management information 8b is obtained from the responded address of the master CM #2. The resource management information 8b possessed by the local CM 4 is updated (Step S32; refer to FIG. 11), and the response reception processing ends.

In contrast, when received response is '0' (the Yes route from Step S31), the update determining unit 44 does not update the resource management information 8b since the resource management information 8b is the latest (refer to FIG. 10) and the response reception processing ends.

In this manner, the processing in the master CMs 4 upon a startup or incorporation of the storage apparatuses 10 ends.

(1-4-2) Example 2 of Operation Upon Startup or Incorporation of Storage Apparatuses Next, referring to FIGS. 12-19, an example of an operation in the slave CMs 4 upon a startup or incorporation of the storage apparatuses 10 will be described.

While processing by the slave CM #1 in the CE #0 will be described, similar processing is carried out by the slave CM (e.g., the CM #3) in the other CE 3 (e.g., the CE #1).

Figure 12:
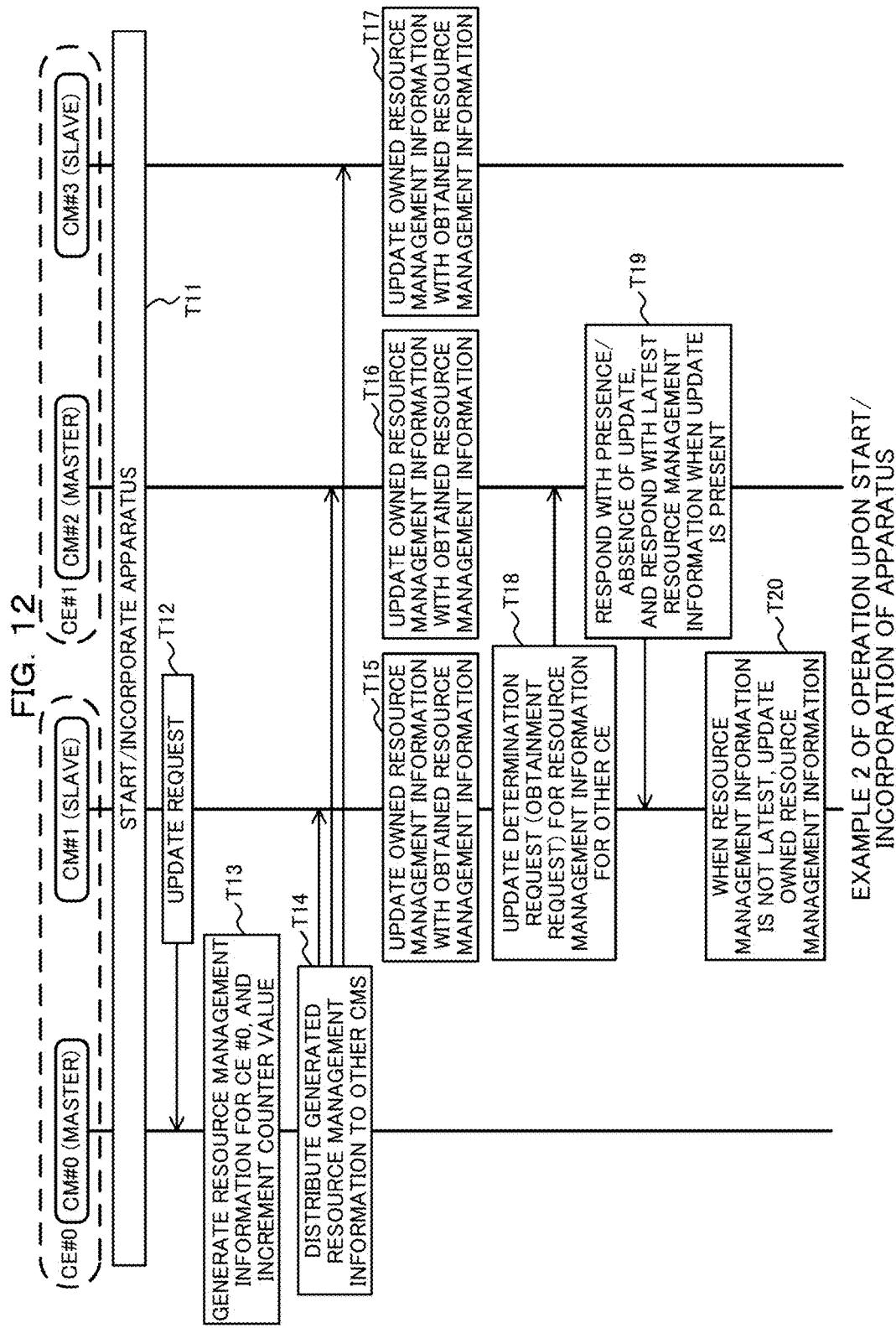
FIG. 12 is a sequence chart illustrating an example of operation upon a startup or incorporation of apparatuses.
Figure 13:
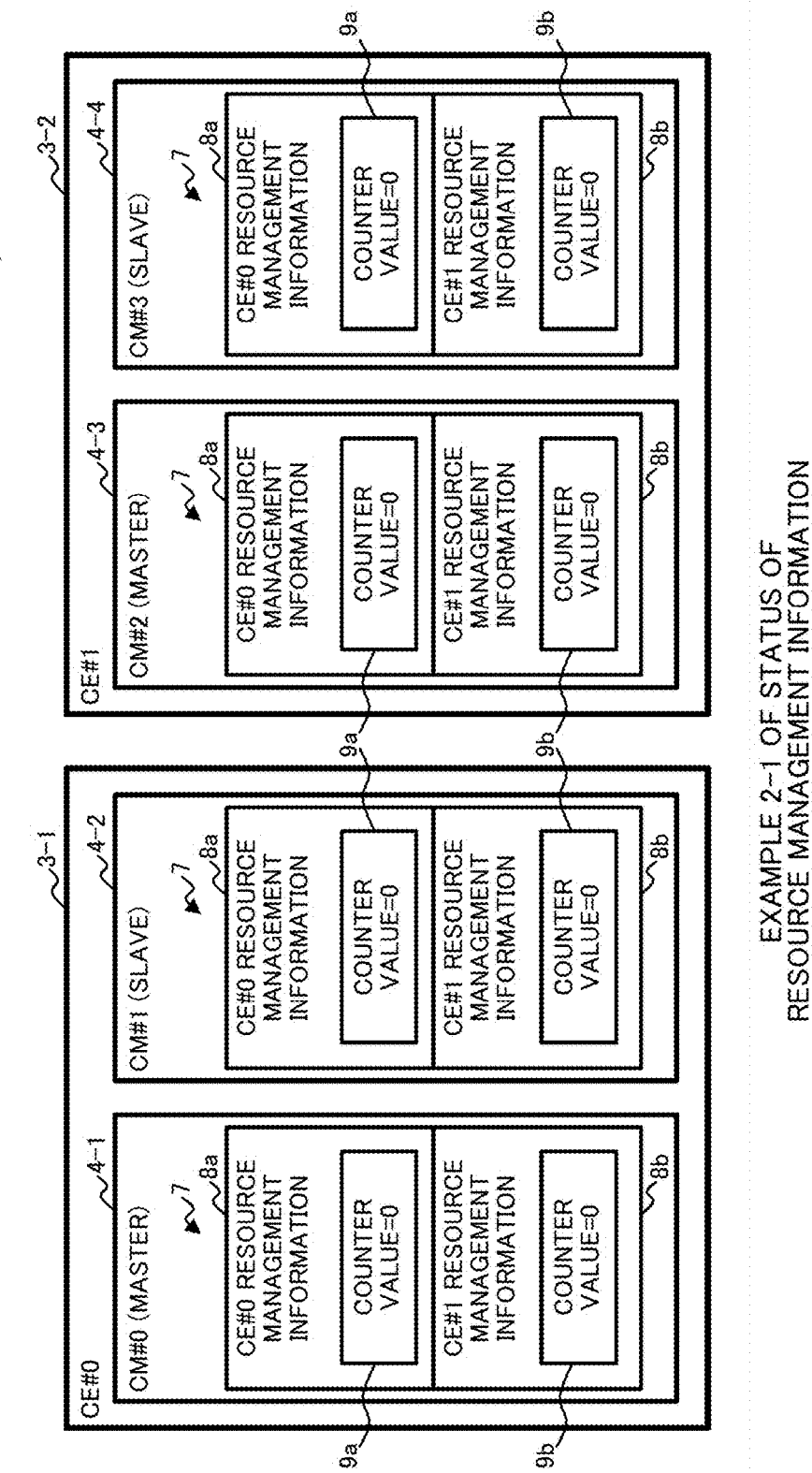
FIGS. 13-19 are diagrams illustrating an example of the state of the resource management information in the illustration in FIG. 12.

Initially, as depicted in FIG. 12, the storage apparatuses 10 are started or incorporated (processing T11). At this time, as depicted in FIG. 13, resource management information 8 possessed by each CM 4 is empty, and counter values 9 have been initialized to their initial values (e.g., '0').

Figure 14:
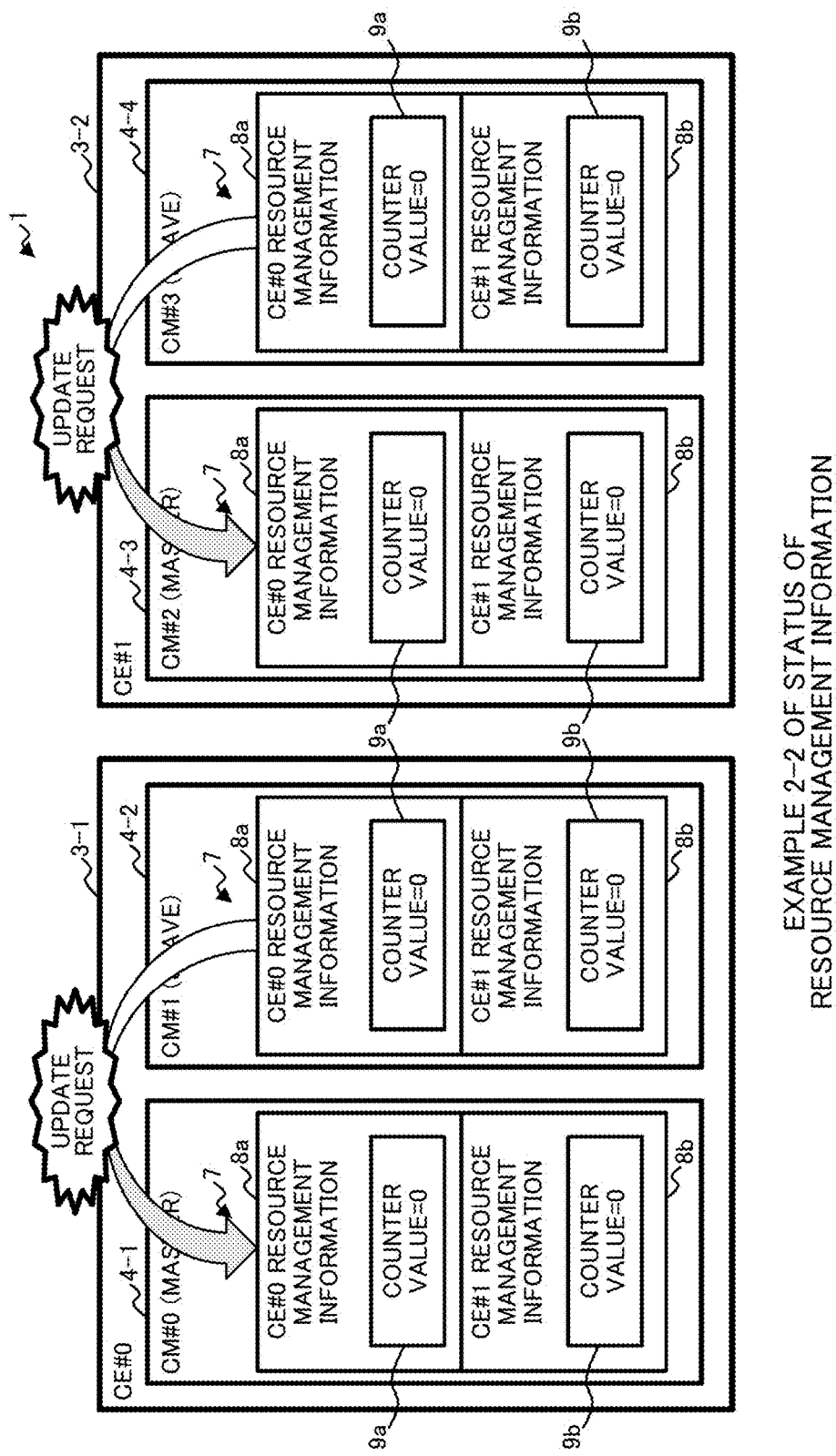

Subsequently, the update processing unit 42 in the incorporated slave CM #1 sends an update request for the resource management information 8a, to the master CM #0 (processing T12; refer to FIG. 14). Similar processing carried out in the slave CM #3 is also depicted in FIG. 14. This also applies to FIGS. 15-19.

Figure 15:
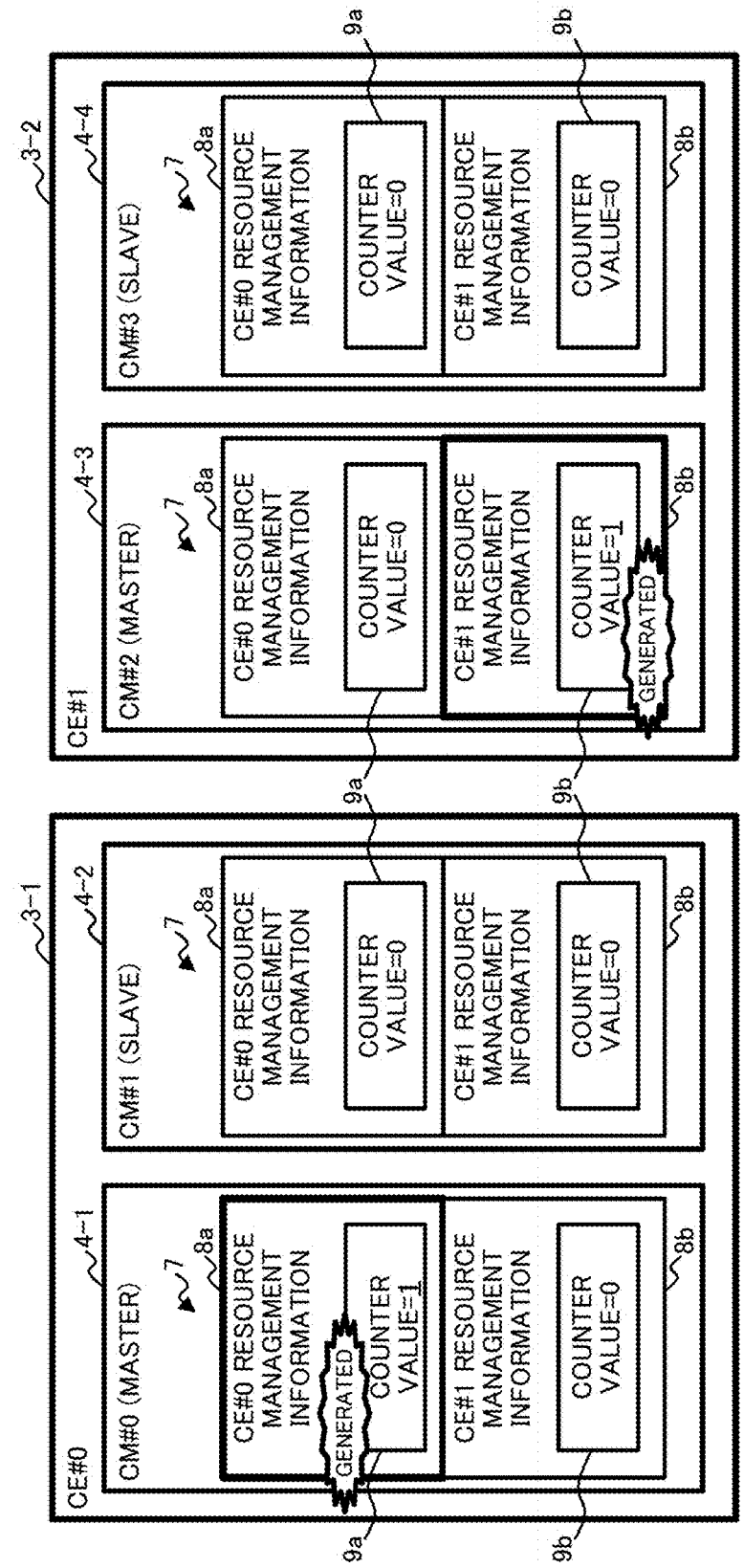

In response to receiving the update request from the slave CM #1, the update processing unit 42 in the master CM #0 generates the resource management information 8a for the CE #0, and increments the counter value 9a, similarly to the processing T3 in FIG. 5 (processing T13; refer to FIG. 15).

Figure 16:
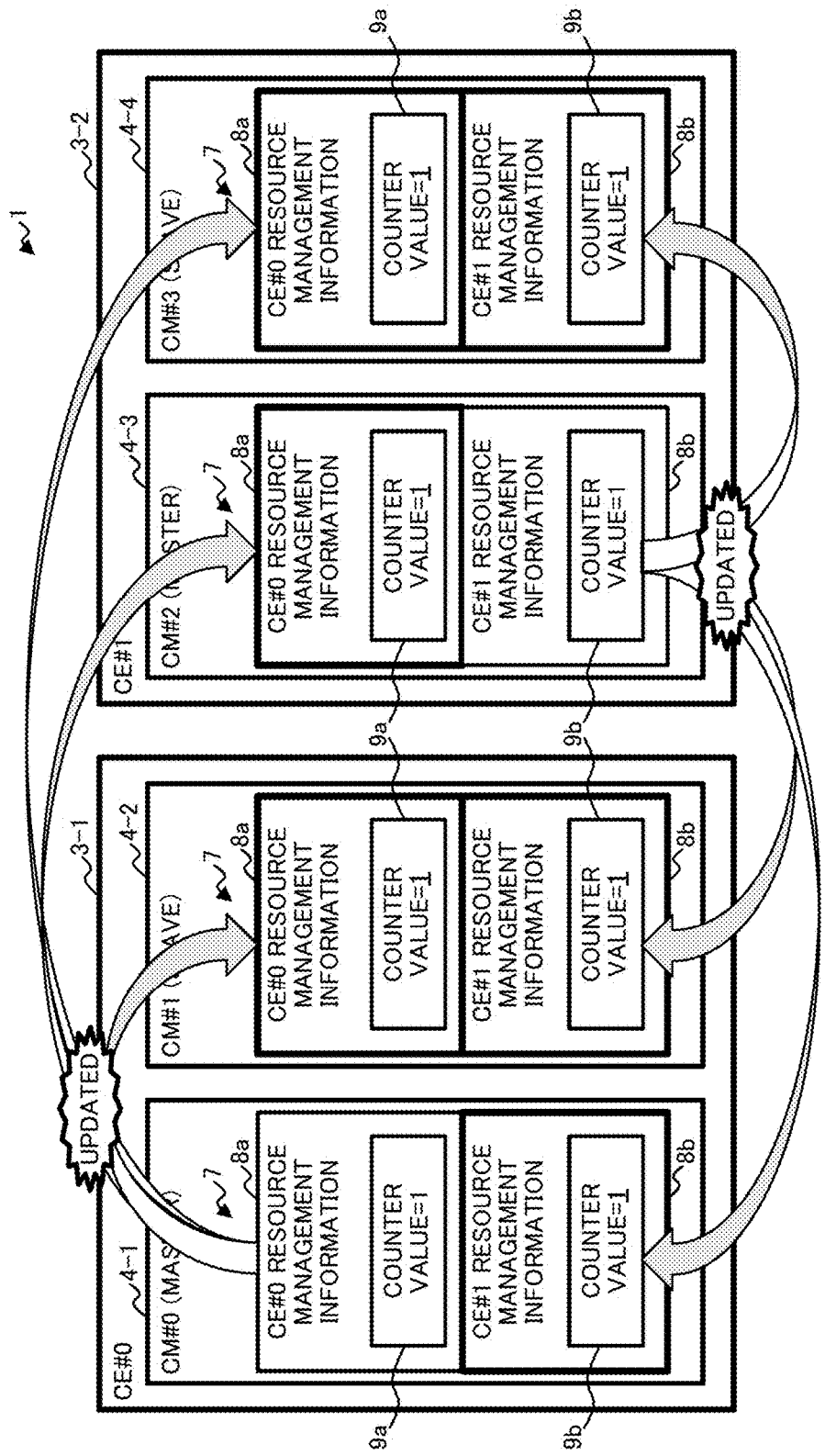
Figure 17:
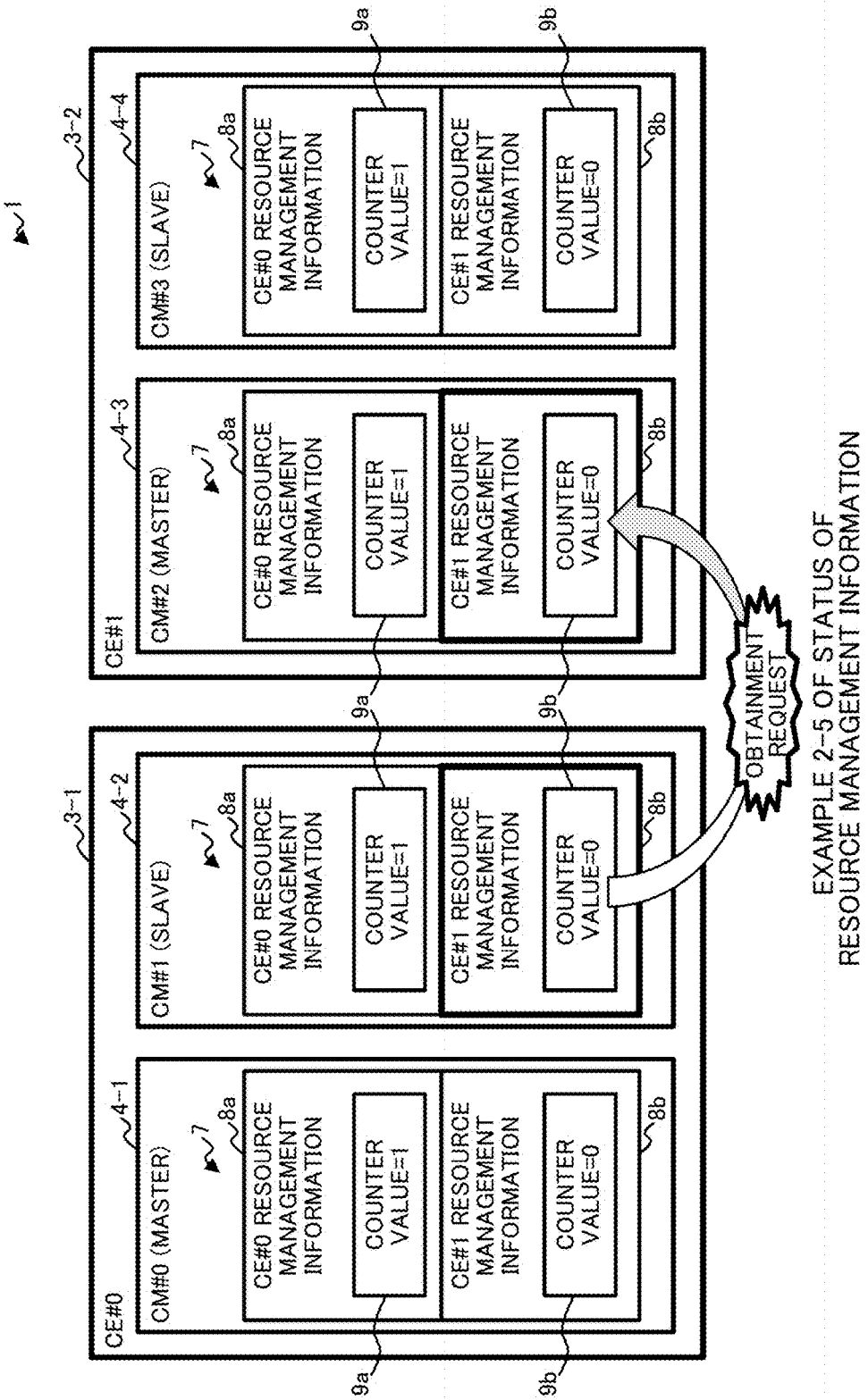
Figure 18:
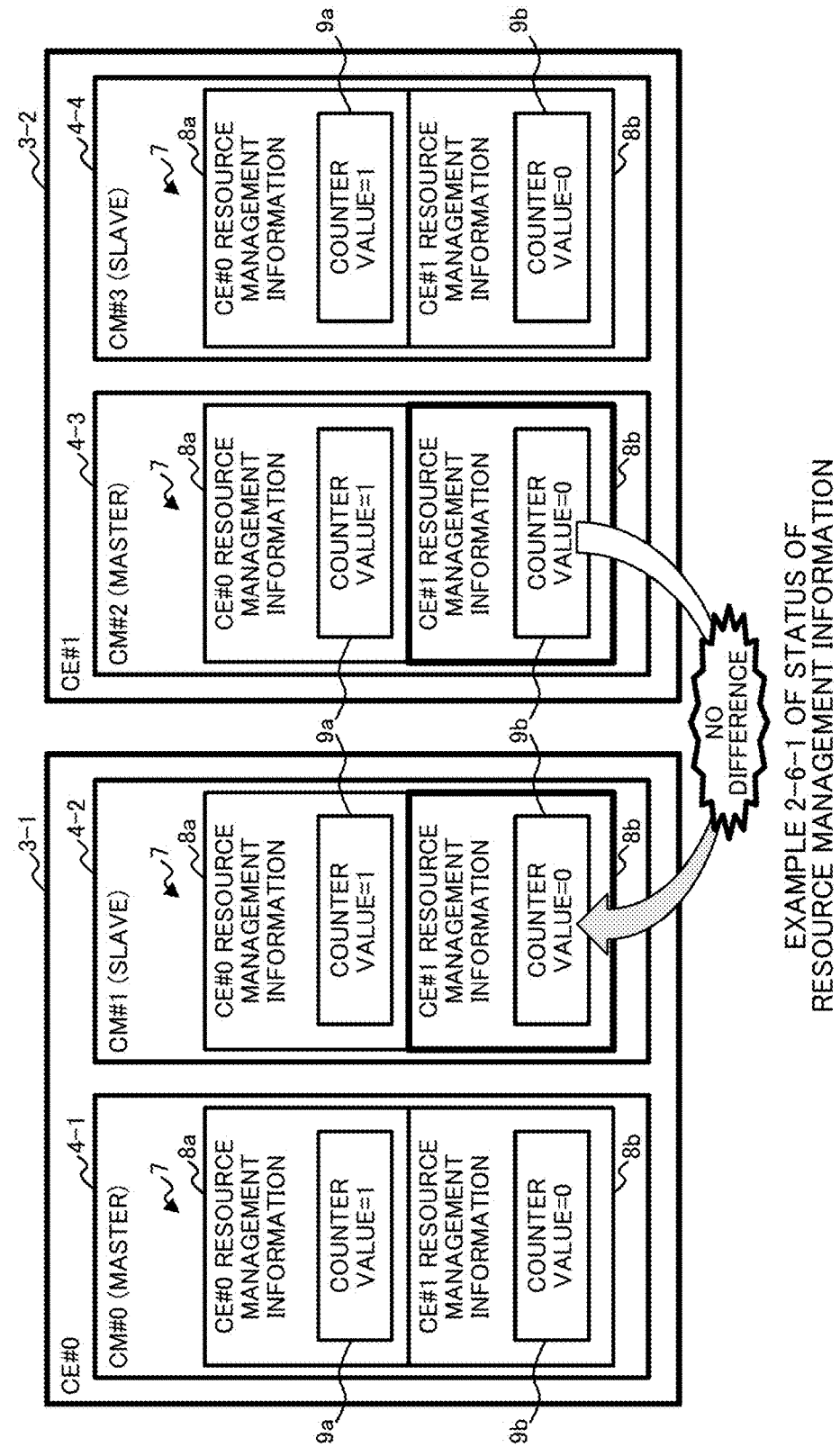
Figure 19:
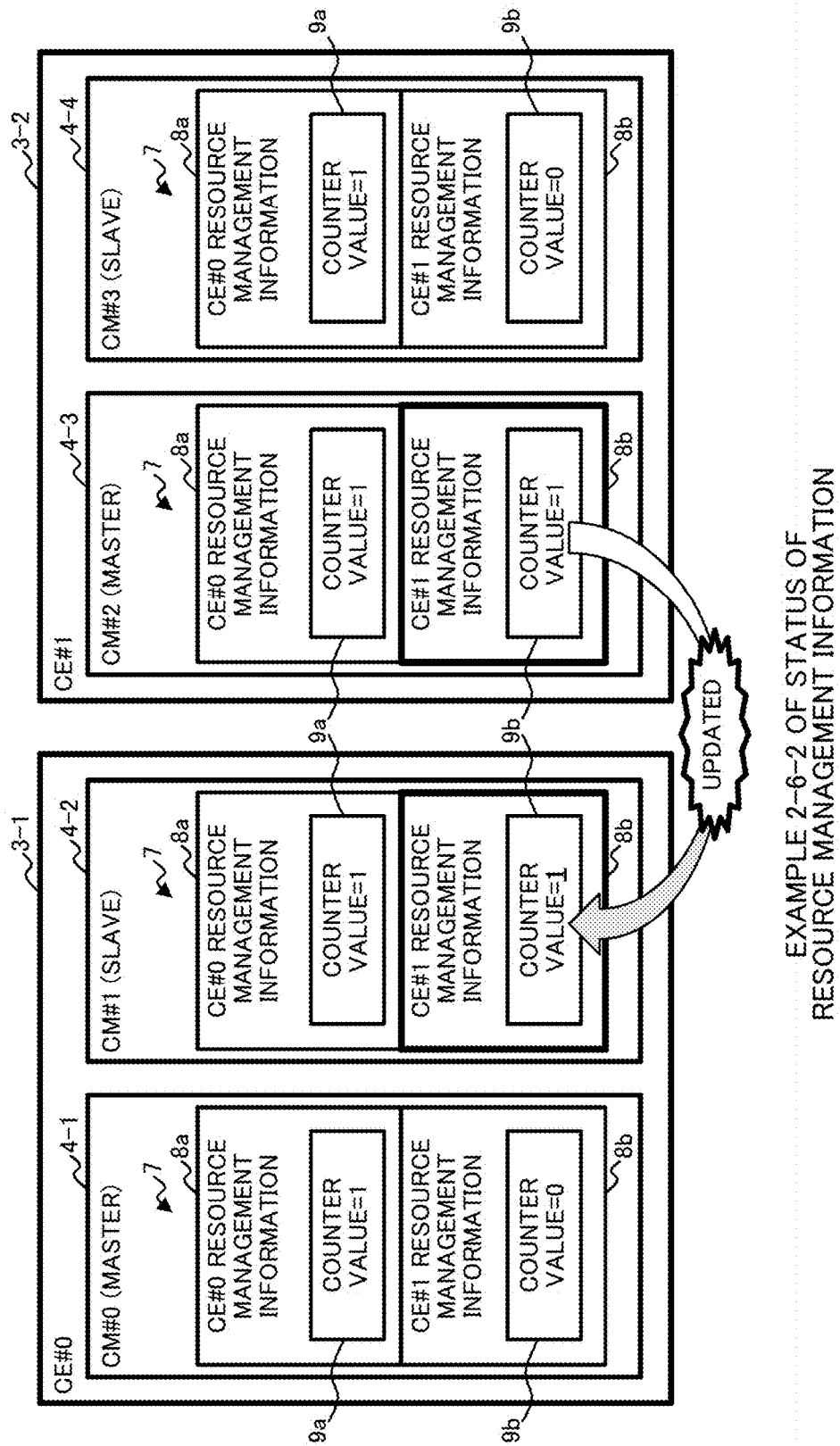

The communication unit 43 in the master CM #0 also distributes the generated resource management information 8a including the counter value 9a, to the other CMs 4, e.g., the CM #1 through the CM #3, similarly to the processing T4 in FIG. 5 (processing T14; refer to FIG. 16 and FIG. 27). Each update processing unit 42 in the other CMs 4 updates the resource management information 8a possessed by that CM 4, with the obtained resource management information 8a (processing T15-T17).

Here, if the generation or distribution of the resource management information 8b by the master CM #2 is delayed, the update determining unit 44 in the slave CM #1 may determine that the counter value 9b in the resource management information 8b for the other CE #1 has an initial value of '0' and that the latest resource management information 8*b* has not been obtained yet. In this case, the communication unit 43 in the slave CM #1 sends an obtainment request including the counter value 9*b* ('0', in this case) for the resource management information 8*b*, to the master CM #2 possessing the resource management information 8*b*, via the communication unit 43 (processing T18; refer to FIG. 17 and FIG. 28).

The update determining unit 44 in the slave CM #1 may cause the communication unit 43 to issue an obtainment request, even when the counter value 9*b* in the resource management information 8*b* for the other CE #1 is not the initial value in the processing T18.

In response to receiving the obtainment request from the slave CM #1, the master CM #2 executes response processing based on the obtainment request exemplified in FIG. 29 (processing T19). The slave CM #1 executes response reception processing exemplified in FIG. 30, based on the response result from the master CM #2 (processing T20).

In the response reception processing, when the response is '0', the update determining unit 44 in the slave CM #1 does not update the resource management information 8*b* since resource management information 8*b* possessed by the local CM 4 is the latest, as described above (refer to FIG. 18). In contrast, when the response is not '0', the update determining unit 44 extracts the latest resource management information 8*b* from the responded address of the master CM #2, to update the resource management information 8*b* possessed by the local CM 4, since the resource management information 8*b* possessed by the local CM 4 is not the latest (refer to FIG. 19).

In this manner, the processing in the slave CMs 4 upon a startup or incorporation of the storage apparatuses 10 ends.

Note that, in the example depicted in FIG. 5, the master CM #0 generates and distributes the resource management information 8*a* spontaneously, upon a startup or incorporation of the storage apparatuses 10 (refer to the processing T2 and T3 in FIG. 5). In contrast, in the example depicted in FIG. 12, the master CM #0 generates and distributes the resource management information 8*a*, in response to an update request from the slave CM #1 (refer to the processing T13 and T14 in FIG. 12).

If an update request is issued from the slave CM #1 before or after the master CM #0 generates (processing T2 in FIG. 5) and distributes the resource management information 8*a* spontaneously, the master CM #0 may carry out the following processing.

When a spontaneous generation of the resource management information 8*a* (processing T2 in FIG. 5) has not been done yet.

Based on an update request from the slave CM #1, the master CM #0 executes the processing T13 (generation of the resource management information 8*a* and update of the counter value 9*a* to "1") and 114 (distribution of the resource management information 8*a*) in FIG. 12, and then executes the processing T7 and T9 in FIG. 5. Alternatively, the master CM #0 may execute the processing T2 and T3 in FIG. 5 after executing the processing T13 and T14.

When the spontaneous generation of the resource management information 8*a* (processing T2 in FIG. 5) is being executed, or the generation is completed but a distribution (processing T3 in FIG. 5) has not been done yet.

After completing the processing T2 (generation of the resource management information 8*a* and update of the counter value 9*a* to "1") in FIG. 5, the master CM #0 executes the processing T14 (distribution of the resource management information 8*a*) in FIG. 12 based on an update request from the slave CM #1 and then executes the processing T7 and T9 in FIG. 5. Alternatively, the master CM #0 may execute the processing T2 and T3 in FIG. 5 again, after executing the processing T14.

Alternatively, the master CM #0 may complete the processing T2 (generation of the resource management information 8*a* and update of the counter value 9*a* to "1") and the processing T3 (distribution of the resource management information 8*a*) in FIG. 5. The master CM #0 may then execute the processing T13 (update of the resource management information 8*a* and update of the counter value 9*a* to "2") and processing T14 (distribution of the resource management information 8*a*) in FIG. 12, based on an update request from the slave CM #1, and then execute the processing T7 and T9 in FIG. 5.

When the spontaneous distribution of the resource management information 8*a* (processing T3 in FIG. 5) is being executed or has been completed.

The master CM #0 executes the processing T13 (update of the resource management information 8*a* and update of the counter value 9*a* to "2") and the processing T14 (distribution of the resource management information 8*a*) in FIG. 12, based on an update request from the slave CM #1, and then executes the processing T7 and T9 in FIG. 5.

As set forth above, in response to receiving an update request from a slave CM 4, a master CM 4 preferably processes the update request, regardless whether or not the resource management information 8 is generated or distributed spontaneously. This reduces the risk of the resource management information 8 being utilized by a slave CM 4 before the resource management information 8 is updated.

(1-4-3) Example of Operation when Resource Management Information is Updated

Figure 21:
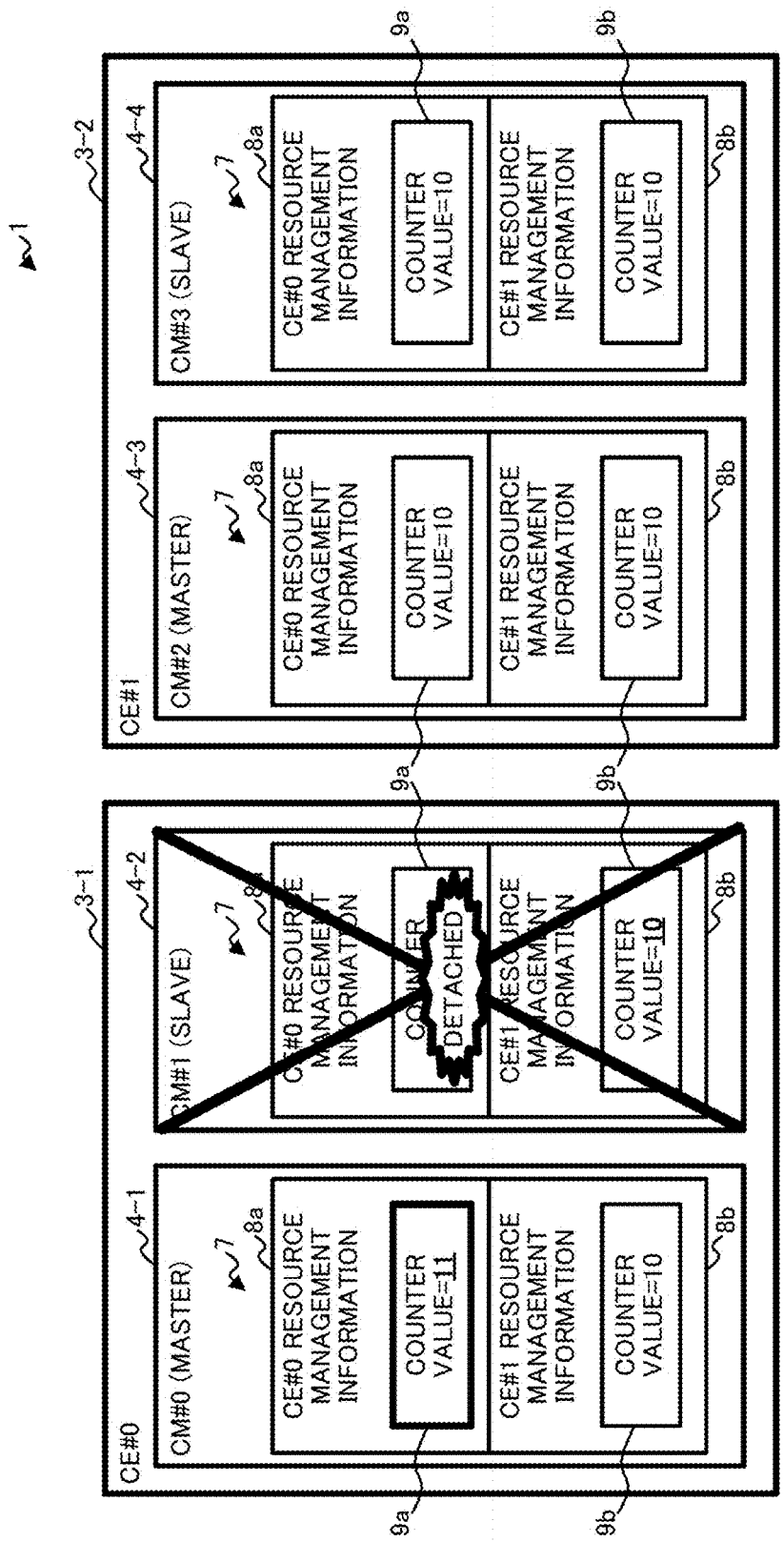
FIGS. 21 and 22 are diagrams illustrating an example of the state of the resource management information in the illustration in FIG. 20.
Figure 22:
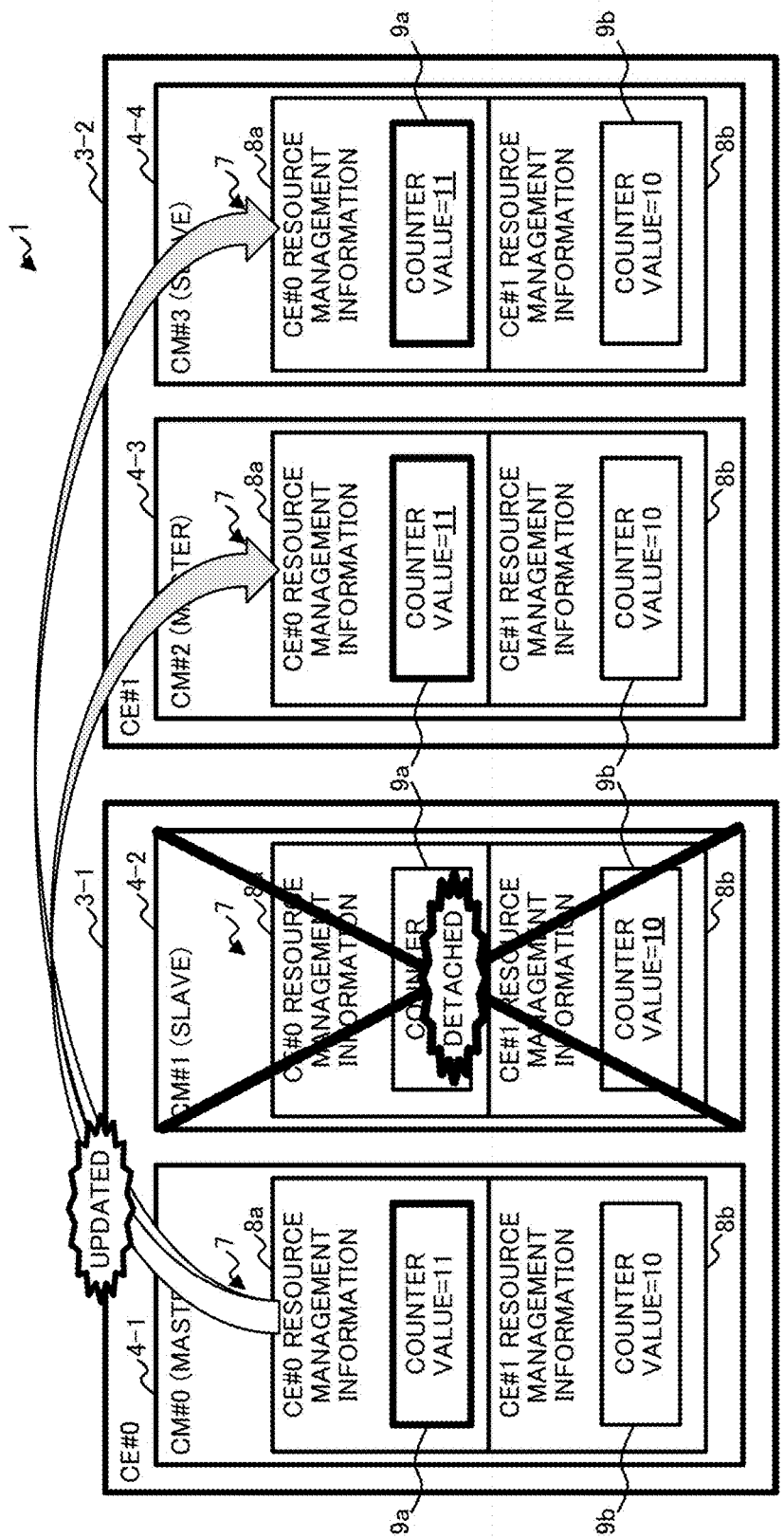

Next, referring to FIGS. 20-22, an example of an operation when resource management information 8 is updated will be described.

Hereinafter, it is assumed that the CMs 4 in the same CE 3 make living confirmations to each other by polling at regular intervals in the storage system 1. A description will be made for an example of an operation when the slave CM #1 in the CE #0 is detached and the resource management information 8*a* is updated. Similar processing may be carried out by a new master CM #1, when the master CM 4 (e.g., the CE #0) is detached and the slave CM (e.g., the CM #1) becomes a new master.

Figure 20:
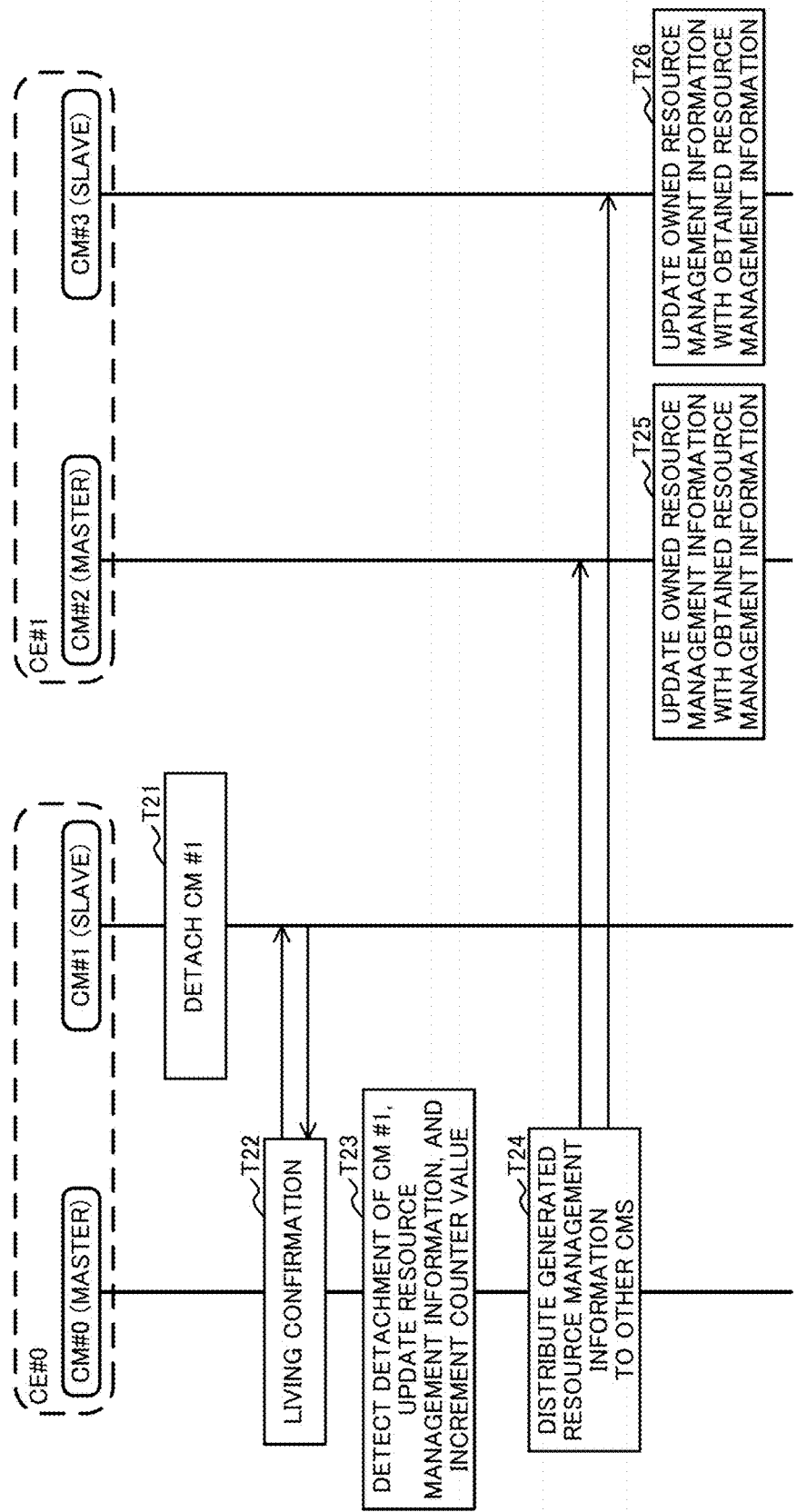
FIG. 20 is a sequence chart illustrating an example of operation when resource management information is update.

As depicted in FIG. 20, after the slave CM #1 is detached from the storage apparatus 10-1 due to a failure or the like (processing T21), the master CM #0 makes a living confirmation to the slave CM #1 at regular intervals (processing T22).

Since the slave CM #1 has been detached, the master CM 1#0 detects the detachment of the CM #1 during the living confirmation. The update processing unit 42 updates the resource management information 8*a*, and increments the counter value 9*a* (processing T23). For example, as depicted in FIG. 21, if the master CM #0 detects the detachment of the slave CM #1 when the counter value 9*a* in the resource management information 8*a* is "10", the update processing unit 42 updates the CM 4 status for the slave CM #1 in the resource management information 8*a*, and updates the counter value 9*a* to "11" by incrementing it.

Subsequently, the communication unit 43 in the master CM #0 distributes the updated resource management information 8*a* including the counter value 9*a*, to the other CMs 4, e.g., the CM #2 and the CM #3, similarly to the processing T4 in FIG. 5 (processing T24; refer to FIG. 27). Each update processing unit 42 in the other CMs 4 updates the resource management information 8a possessed by that CM 4, with the obtained resource management information 8a (processing T25 and T26; refer to FIG. 22).

In the processing T24, the determination as to whether or not the selected CM 4 is operating in Step S3 in FIG. 27 suppresses distribution of the resource management information 8a, to the detached slave CM #1 (the No route from Step S3).

In this manner, the processing ends where the resources to be managed are modified due to a detachment of a CM 4 or the like, and the resource management information 8 is updated.

(1-4-4) Example of Operation Before Resource Management Information is Looked Up Next, referring to FIGS. 23-26 and 31, an example of an operation before resource management information 8 is looked up by a CM 4 will be described.

As described above, there is some time delay between the configuration of a storage apparatus 10 managed by a CE 3 is modified and the latest resource management information 8 is distributed to the other CE 3 based on the modification. Depending on the timing when the other CE 3 attempts to lookup the resource management information 8, obsolete resource management information 8 (before an update) may be looked up instead.

In order to prevent such a situation, a CM 4 may check whether or not resource management information 8 for the other CE 3 is the latest, before looking up the resource management information 8.

Figure 23:
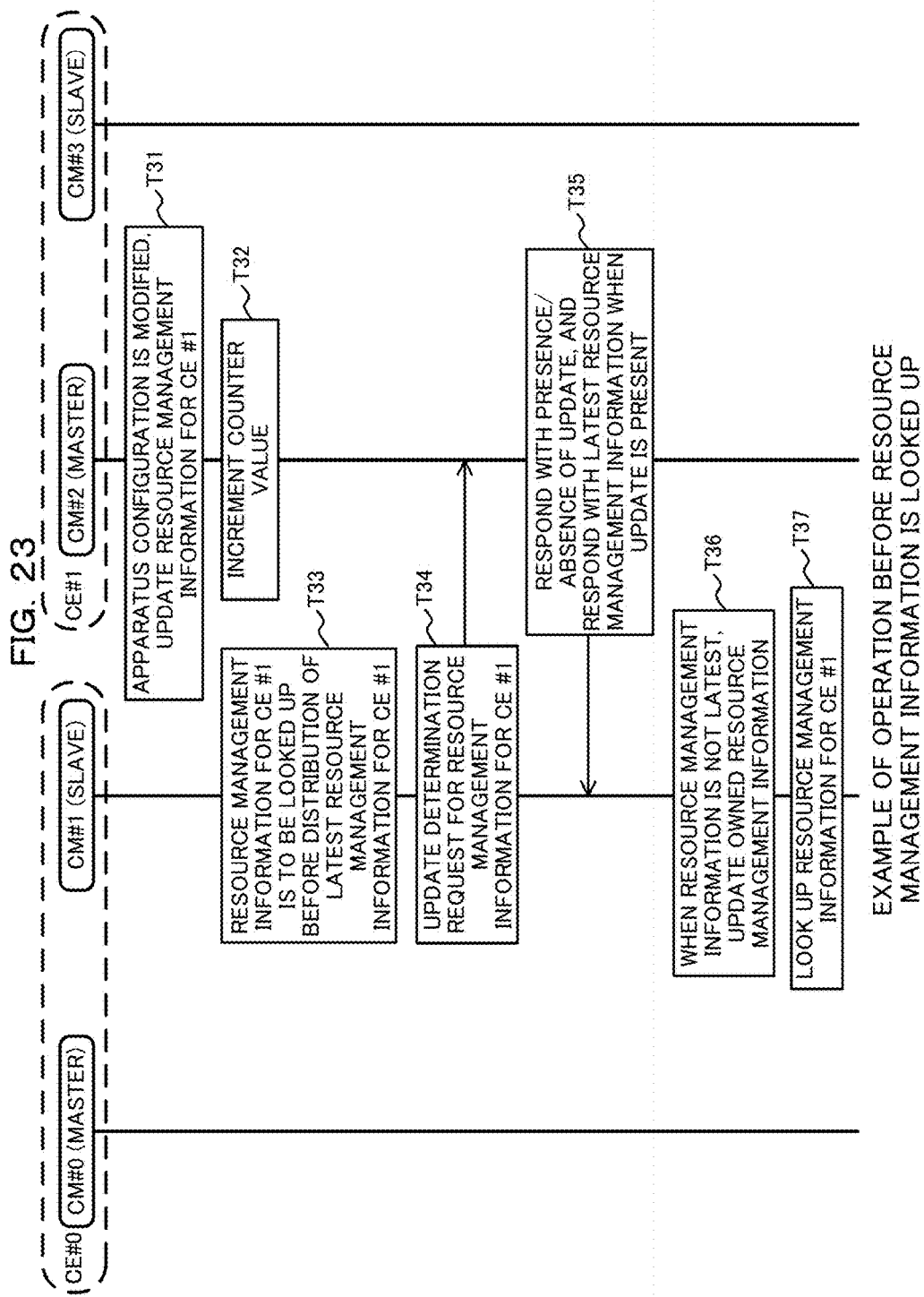
FIG. 23 is a sequence chart illustrating an example of operation before a lookup of resource management information.

For example, as depicted in FIG. 23, when the configuration of the storage apparatus 10-2 is modified in the CE #1, the update processing unit 42 in the master CM #2 updates the resource management information 8b for the CE #1 (processing T31). The master CM #2 also increments the counter value 9b in the resource management information 8b (processing T32).

Here, it is assumed that, before the resource management information 8b for the CE #1 updated by master CM #2 is distributed to the other CMs 4 (e.g., the CM #0, the CM #1, and the CM #3), the slave CM #1 in the CE #0 attempts to look up the resource management information 8b for the CE #1 (processing T33).

Figure 24:
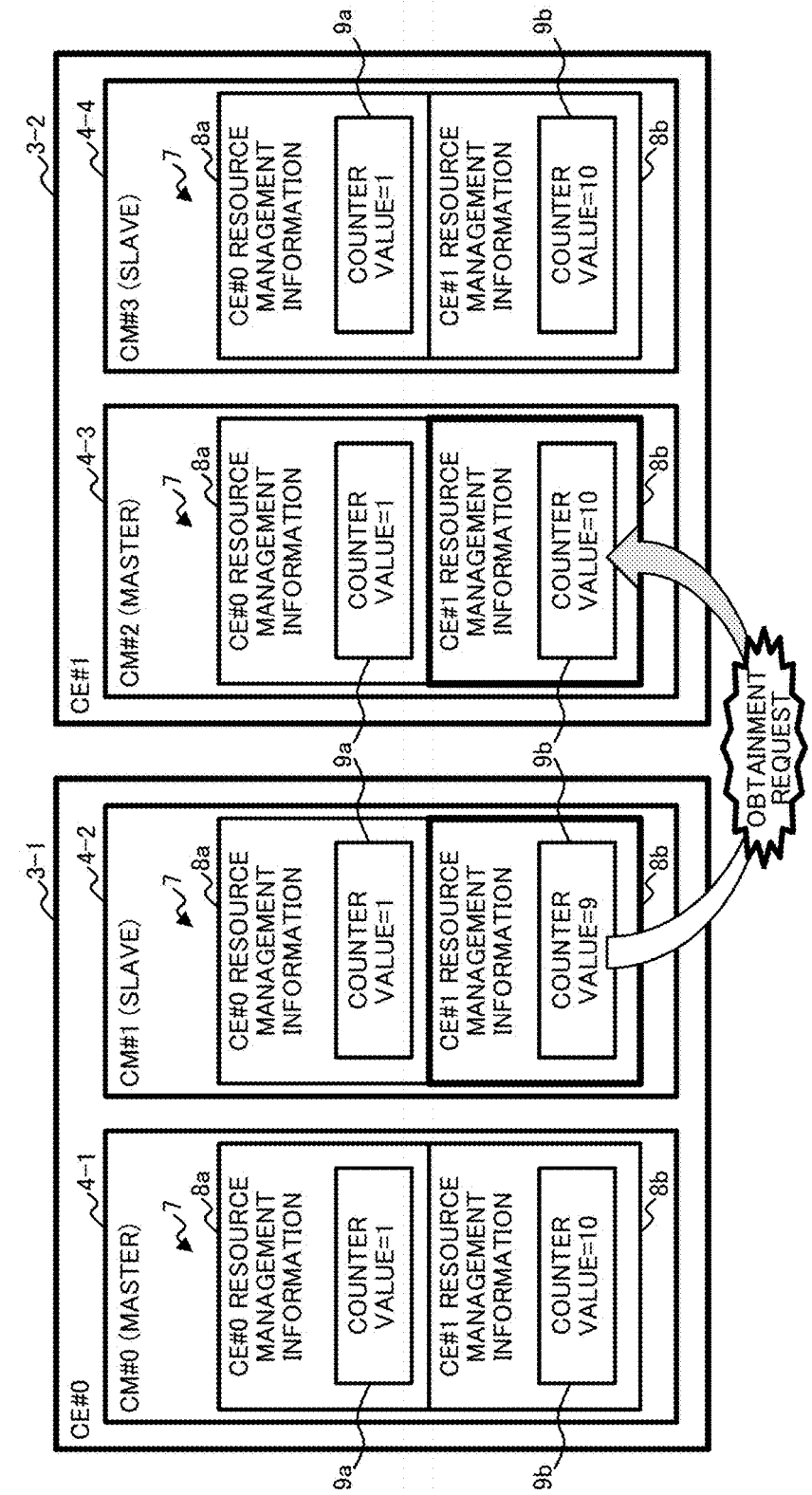
FIGS. 24-26 are diagrams illustrating an example of the state of the resource management information in the illustration in FIG. 23.
Figure 25:
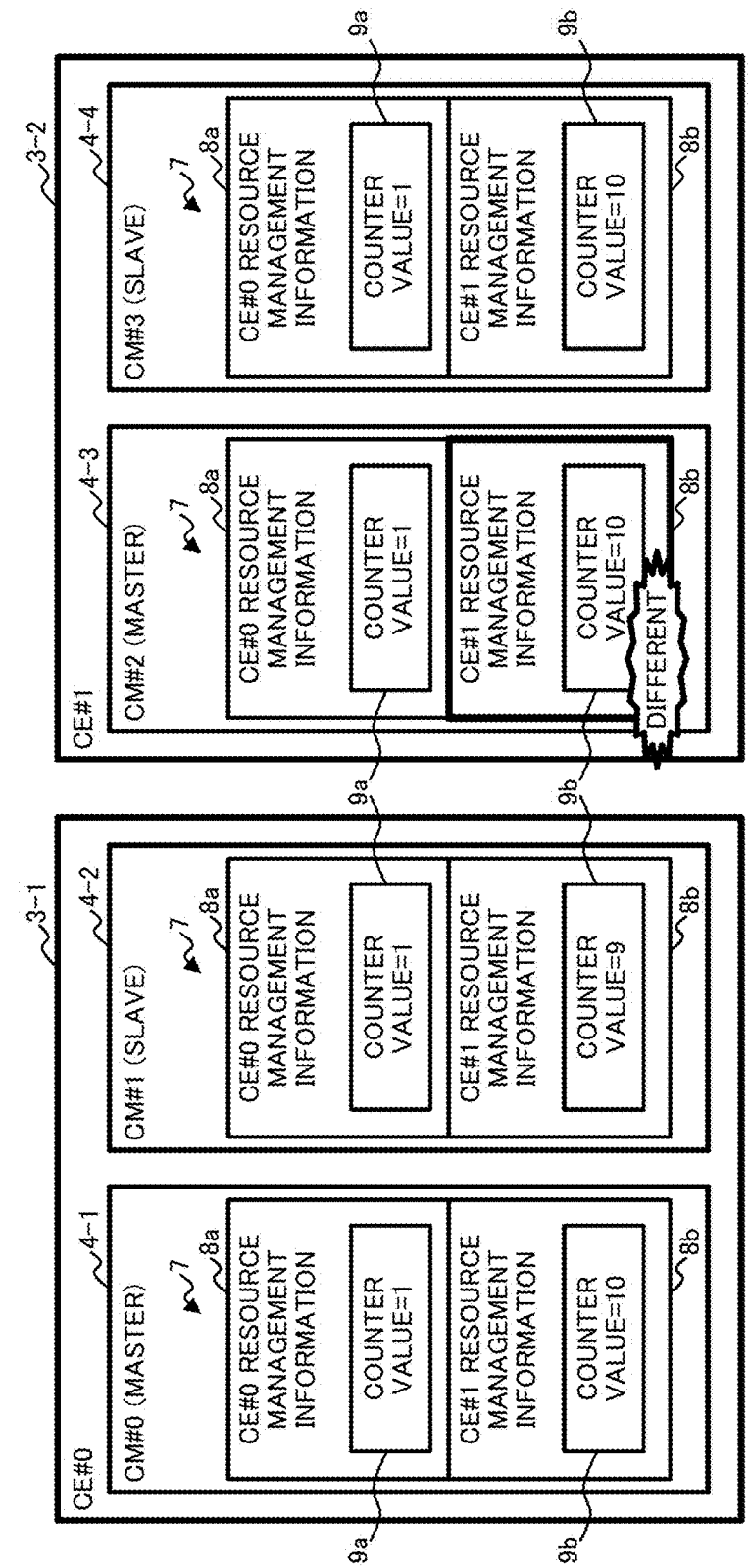
Figure 26:
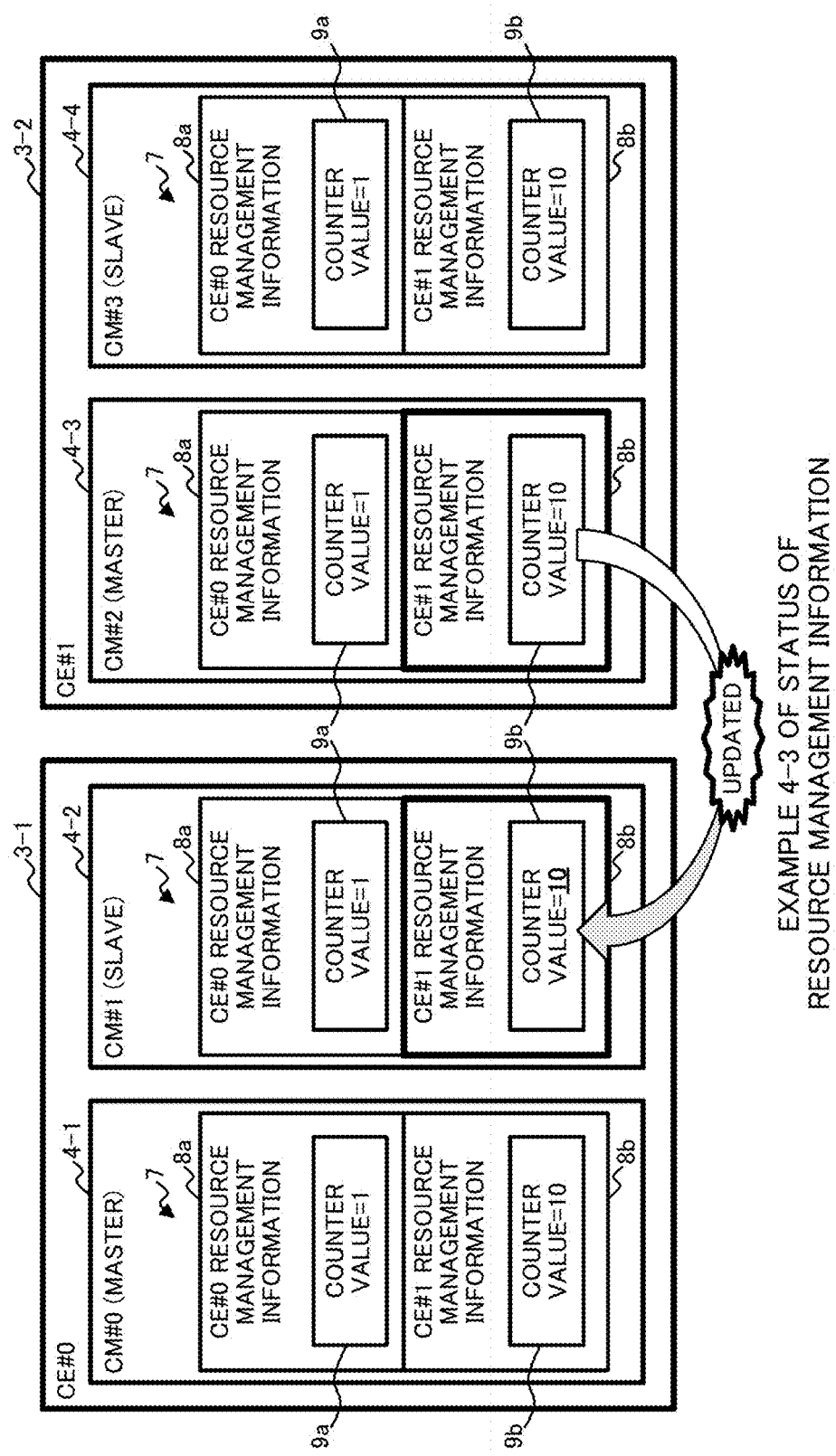
Figure 31:
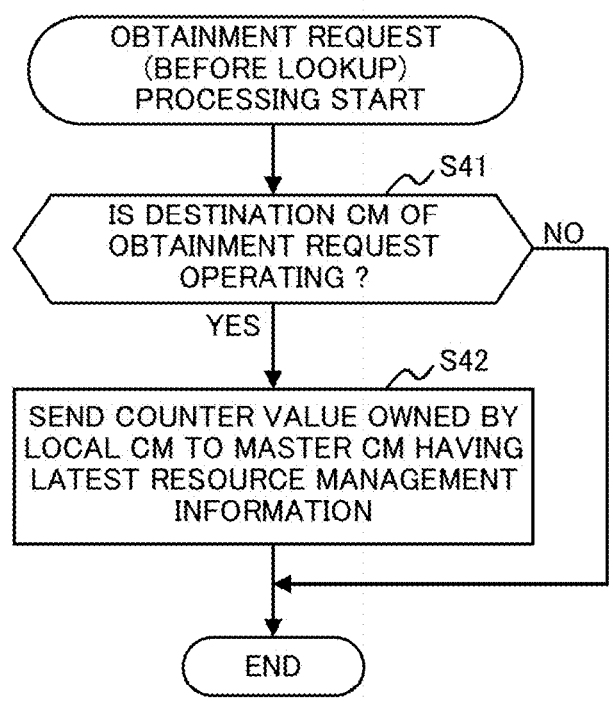
FIG. 31 is a flowchart illustrating an example of operation of obtainment request processing before a lookup of resource management information.

In this case, the update determining unit 44 in the slave CM #1 makes an obtainment request (update determination request) for the target resource management information 8b, to the master CM #2 in the CE #1 (processing T34; refer to FIG. 24 and FIG. 31).

Here, the obtainment request processing before lookup of the resource management information 8 in the processing T34 will be described. In the obtainment request (before lookup) processing, as depicted in FIG. 31, the communication unit 43 determines whether or not the master CM 4 (i.e., the destination CM 4 of an obtainment request) managing the target resource management information 8, is operating (Step S41).

When the obtainment request destination CM 4 is not operating (the No route from Step S41), the obtainment request processing ends. In this case, the CM 4 (e.g., the slave CM #1) may notify an administration terminal or the like used by an administrator, of an error. When the obtainment request destination CM 4 is not operating, it is high possible that the other CM 4 in that CE 3 is operating as the master CM 4. Accordingly, the CM 4 may look up the resource management information 8, and execute the processing in Step S41 again by selecting the CM 4 other than the obtainment request destination CM 4 in the CE 3, as a new obtainment request destination CM 4.

In contrast, when the obtainment request destination CM 4 is operating (the Yes route from Step S41), the communication unit 43 sends the counter value 9 in the requested resource management information 8 possessed by the local CM 4, to the obtainment request destination CM 4 possessing the latest resource management information 8 (Step S42) and the obtainment request processing ends.

Referring back to FIG. 23, in response to receiving the obtainment request from the slave CM #1, the master CM #2 executes response processing exemplified in FIG. 29, based on the obtainment request (processing T35).

In the response processing, for example, when the counter value 9b included in the obtainment request and the counter value 9b in the resource management information 8b possessed by the local CM #2 do not match (refer to FIG. 25), the update determining unit 44 in the master CM #2 causes the communication unit 43 to make a response with an address of the resource management information 8b possessed by the local CM #2. In contrast, when the two counter values 9b match, the update determining unit 44 causes the communication unit 43 to respond with '0'.

Also, the slave CM #1 executes response reception processing exemplified in FIG. 30, based on the response result from the master CM #2 (processing T36).

In the response reception processing, when the response is '0', the update determining unit 44 in the slave CM #1 does not update the resource management information 8b since the resource management information 8b possessed by the local CM 4 is the latest, as described above. In contrast, when response is not '0', the update determining unit 44 extracts the latest resource management information 8b from the responded address of the master CM #2, to update the resource management information 8b possessed by the local CM 4, since the resource management information 8b possessed by the local CM 4 is not the latest (refer to FIG. 26).

The slave CM #1 then looks up the resource management information 8b for the CE #1 (processing T37). In this manner, the processing before the resource management information 8 is looked up by the CM 4, ends.

An increase in the communication data volume may be induced if the CMs 4 check whether resource management information 8 is the latest before making lookup, for all of the items in the resource management information 8. Hence, in one embodiment, the CMs 4 may execute an obtainment request (update determination request) processing for resource management information 8, only for limited items in the resource management information 8 before making a lookup.

As one example, the obtainment request processing for resource management information 8 may be made before making a lookup, only for relatively important items (e.g., the statuses of the CMs 4) relevant to operations of the storage system 1, such as living confirmations of the other CMs 4, for example.

By limiting the items for which the obtainment request processing can be made, it is possible to reduce the communication data volume induced by checks as to whether or not the resource management information 8 has been updated, as compared to the technique in accordance with one embodiment. As a result, it is possible to further prevent a reduction in the performance of the storage system 1.

As set forth above, the storage system 1 in accordance with one embodiment is provided with a counter for managing resource management information 8 in each CM 4, which is counted up in response to a change in the statuses of the managed resources. When the counter is counted up, the resource management information 8 for the modified resource and the counter value 9 are notified to the other CMs 4. Each CM 4 makes an inquiry to the other CM 4, as to whether or not the resource management information 8 for the other CM 4 is the latest, by sending the corresponding counter value 9. When the latest resource management information 8 is present in the other CM 4, the CM 4 can obtain the latest resource management information 8.

The communication data volume would be increased, if relatively large-sized data (e.g., resource management information 8) is sent every time an inquiry is made by sending resource information 7, for utilizing resource management information 8 managed by another CM 4. In contrast, in accordance with the storage system 1 described above, since resource management information 8 in a minimum data size possessed by each CM 4 is exchanged among the CMs 4, data exchange can be efficiently achieved in a smaller communication data volume. As a result, a reduction in the performance of the storage system 1 due to communications of management information among the CMs 4 can be suppressed.

As set forth above, if a reduction in the processing performance of the storage system 1 and effects of delay of distribution of resource management information 8 are tolerated, sharing of resource management information 8 can be achieved by exchanging the resource management information 8 among the CMs 4 at regular intervals. However, in a system (e.g., the storage system 1) where the performance and the accuracy of processing are requested, it is difficult to tolerate these disadvantages.

For example, in a large-scale storage system 1 having a large number of CEs 3 (e.g., 16 CEs 3), the number of CMs 4, to which resource management information 8 and counter values 9 are to be sent, is increased. Such a system is more susceptible to the processing delay in source CMs 4 and congestions on propagation paths, as compared to the example described above. As a result, the delay would be extended until destinations CM 4 obtain the latest information after resource management information 8 and a counter value 9 are updated in a source CM 4.

In the technique in accordance with one embodiment, even when there is an extended delay to update resource management information 8 for the other CE 3, the CMs 4 make an inquiry as to whether or not the resource management information 8 has been updated before utilizing it. As a result, the risk of wrong (obsolete) resource management information 8 to be looked up, can be reduced.

In addition, when the inquiry reveals that the resource management information 8 to be looked up is the latest, the resource management information 8 is prevented from being sent by the other CM 4. As a result, an increase in the communication data volume is suppressed, and the probability of congestions on the propagation paths is reduced.

As described above, the technique in accordance with one embodiment is preferably used for a storage system 1, particularly a system including a large-scale storage system 1, where the performance and the accuracy of processing are requested.

In addition, in one embodiment, a counter value 9 is attached to resource management information 8, as an indicator indicating whether or not the resource management information 8 has been modified.

By using the counter values 9 inplace of flags, it becomes possible to relate a modification to the resource management information 8, to the counter values 9. In other words, it becomes possible to modify a counter value 9 in response to a modification to the resource management information 8. Accordingly, when debugging or a trace is carried out upon a failure of the storage system 1, it is possible to analyze and track the particular resource management information 8 at the time when the failure occurred, from resource management information 8 that is stored.

In addition, since counter values 9 are defined as numeral values rather than date and time information, it is possible to eliminate a function to synchronize date and time among the CMs 4 used in the case where date and time information is provided to resource management information 8. This helps to simplify the functions of the storage system 1. Furthermore, it is also possible to eliminate any countermeasures to adjust time differences among the CMs 4 upon synchronizing date and time, such as, functions to advance or retard date and time.

(2) Miscellaneous

The technique in accordance with one embodiment described above can be embodied in a variety of modifications and variations as follows.

For example, function blocks in the CMs 4 depicted in FIG. 3 may be combined into any combinations, or may be divided.

In addition, while the storage system 1 has been described to include two CEs 3, this is not limiting and the storage system 1 may be provided with N CEs 3 (N is an arbitrary natural number). In this case, the memory unit 41 may include resource management information 8 and counter values 9 in numbers identical to the number of the storage apparatuses 10 (CEs 3) configuring the storage system 1.

Furthermore, while a CM 4 distributes, to the other CMs 4, resource management information 8 and a counter value 9 corresponding to the local CE 3 in resource information 7 possessed by that CM 4, this is not limiting. For example, a CM 4 may distribute, to the other CMs 4, at least apart of resource management information 8 and a counter value 9 corresponding to the local CE 3 in resource information 7 possessed by that CM 4, such as the entire resource information 7.

In addition, while each of the multiple CMs 4 includes functions to distribute and obtain resource management information 8 and a counter value 9 in one embodiment, this is not limiting. For example, some of the CMs 4 may distribute resource management information 8, and the rest of the CMs 4 may obtain the resource management information 8. In such a case, each of the CMs 4 may execute a control programs 40 for embodying the respective divided functions (roles), namely, the functions of the update processing unit 42, the communication unit 43, and the update determining unit 44 which are divided into the distribution and obtainment functions, for example.

While the storage system 1 has been described as an information processing system wherein the respective control apparatuses share management information in one embodiment, this is not limiting.

Another example of the above-described information processing system may be a computer system to which multiple peripheral devices are connected, such as an information processing system including multiple servers and multiple service processors that control and monitor the multiple servers, for example. Even in such an information processing system, the technique in accordance with one embodiment can be utilized for sharing respective monitor information of the multiple service processors, among the service processors, as one example of the control apparatuses. In this case, for example, the monitor information, which is as one example of management information, may be related to counter values for determining whether or not obtainment and distribution of the monitor information are requested.

As described above, in an information processing system in accordance with one embodiment, preferably, resources managed by control apparatuses are organized, a formatting system employed by the control apparatuses is provided for managing their own resources, and a data description system is established for describing the statuses of the resources managed by multiple control apparatuses. The technique in accordance with one embodiment is easily applied to such information processing systems.

In one aspect, a reduction in the performance of the system caused by exchange of management information among control apparatuses can be suppressed.

All examples and conditional language recited provided herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A control apparatus in a plurality of control apparatuses provided in a system, the control apparatus served as a first control apparatus comprising:
   a memory unit configured to store first management information managed by the first control apparatus, first modification information indicating update status of the first management information, second management information managed by a second control apparatus different from the first control apparatus among the plurality of control apparatuses, and second modification information indicating update status of the second management information, the first management information being shared with the second control apparatus storing first management information by distributing updated first management information to the second control apparatus, and the second management information stored in the first control apparatus being shared with the second control apparatus storing second management information by obtaining updated second management information from the second control apparatus; and
   a processor coupled to the memory unit, the processor configured to:
      in response to receiving first modification information corresponding to the first management information managed by the first control apparatus from the second control apparatus, compare the first modification information which is received from the second control apparatus, with the first modification information stored in the memory unit;
      when the first modification information which is received from the second control apparatus does not match the first modification information stored in the memory unit, send the second control apparatus a response including information about the first management information and the first modification information stored in the memory unit, to cause the first management information and the first modification information stored in the second control apparatus, to be updated based on the information included in the response.

2. The control apparatus according to claim 1, wherein the processor being configured to notify a response indicating that the first management information stored in the second control apparatus has not been updated, when the first modification information which is received matches the first modification information stored in the memory unit.

3. The control apparatus according to claim 1, wherein the processor being configured to:
   cause the first modification information stored in the memory unit to be modified, in response to the first management information stored in the memory unit being modified; and
   notify the second control apparatus of information about the first management information and the first modification information which are modified.

4. The control apparatus according to claim 3, wherein the first modification information is a counter value that is updated by the processor in response to the first management information being modified.

5. The control apparatus according to claim 3, wherein the processor being configured to:
   in order for the first control apparatus to utilize third management information managed by a third control apparatus in the system, send third modification information corresponding to the third management information stored in the memory unit, to the third control apparatus;
   in response to receiving a response including information about the third management information and the third modification information stored in the third control apparatus, from the third control apparatus, update the third management information and the third modification information stored in the memory unit, based on the response; and
   utilize the third management information which is updated.

6. The control apparatus according to claim 5, wherein the processor being configured to utilize the third management information stored in the memory unit, when a response indicating that the third management information stored in the memory unit has not been updated, is received from the third control apparatus.

7. An information processing system comprising:
   a plurality of control apparatuses including first and second control apparatuses, each of the first and second control apparatuses comprising: a memory unit; and a processor coupled to the memory unit,
   each of the memory unit being configured to store first management information managed by the first control apparatus, first modification information indicating update status of the first management information, second management information managed by a second control apparatus different from the first control apparatus among the plurality of control apparatuses, and second modification information indicating update status of the second management information, the first management information stored in the first control apparatus being shared with the second control apparatus storing first management information by distributing updated first management information to the second control apparatus, and the second management information stored in the first control apparatus being shared with the second control apparatus storing second management information by obtaining updated second management information from the second control apparatus, the processor of the second control apparatus being configured to send, in order to utilize the first management information, the first modification information corresponding to the first management information stored in the memory unit of the second control apparatus, to the first control apparatus, the processor of the first control apparatus, when the first modification information received from the second control apparatus does not match the first modification information stored in the memory unit of the first control apparatus, send the second control apparatus a response including information about the first management information and the first modification information stored in the memory unit of the first control apparatus, and the processor of the second control apparatus being configured to update the first management information and the first modification information stored in the memory unit of the second control apparatus, based on the information included in the response received from the first control apparatus, and utilize the first management information which is updated.

8. The information processing system according to claim 7, wherein the processor of the first control apparatus being configured to notify, when the first modification information which is received matches the first modification information stored in the memory unit, a response indicating that the first management information stored in the memory unit of the second control apparatus has not been updated, and the processor of the second control apparatus being configured to utilize, in response to receiving the response indicating that the first management information has not been updated, the first management information stored in the memory unit of the second control apparatus.

9. The information processing system according to claim 7, wherein the processor of the first control apparatus being configured to:

in response to the first management information stored in the memory unit of the first control apparatus being modified, cause the first modification information stored in the memory unit of the first control apparatus to be modified; and notify the second control apparatus of information about the first management information and the first modification information which are modified.

10. The information processing system according to claim 9, wherein the first modification information is a counter value that is modified by the first control apparatus, in response to the first management information being modified.

11. A non-transitory computer-readable storage medium having a control program stored therein, the control program causes a computer served as a first computer in a plurality of computers provided in a system, to execute a process comprising:

managing a memory unit, the memory unit configured to store first management information managed by the first computer, first modification information indicating update status of the first management information, second management information managed by a second computer different from the first computer among the plurality of computers, and second modification information indicating update status of the second management information, the first management information being shared with the second computer storing first management information by distributing updated first management information to the second computer, and the second management information stored in the first computer being shared with the second computer storing second management information by obtaining updated second management information from the second computer;

in response to receiving first modification information corresponding to the first management information managed by the first computer from the second computer, comparing the first modification information which is received from the second computer, with the first modification information stored in the memory unit; and when the first modification information which is received from the second computer does not match the first modification information stored in the memory unit, sending the second computer a response including information about the first management information and the first modification information stored in the memory unit, to cause the first management information and the first modification information stored in the second computer, to be updated based on the information included in the response.

12. The non-transitory computer-readable storage medium according to claim 11, wherein the process further comprises notifying a response indicating that the first management information stored in the second computer has not been updated, when the first modification information which is received matches the first modification information stored in the memory unit.

13. The non-transitory computer-readable storage medium according to claim 11, wherein the process further comprises:

causing the first modification information stored in the memory unit to be modified, in response to the first management information stored in the memory unit being modified; and notifying the second computer of information about the first management information and the first modification information which are modified.

14. The non-transitory computer-readable storage medium according to claim 13, wherein the first modification information is a counter value that is updated by the first computer in response to the first management information being modified.

15. The non-transitory computer-readable storage medium according to claim 13, wherein the process further comprises:

in order for the first computer to utilize third management information managed by a third computer in the system, sending third modification information corresponding to the third management information stored in the memory unit, to the third computer;

in response to receiving a response including information about the third management information and the third modification information stored in the third computer, from the third computer, updating the third management information and the third modification information stored in the memory unit, based on the response; and determining that the third management information which is updated is available.

16. The non-transitory computer-readable storage medium according to claim 15, wherein the process further comprises determining that the third management information stored in the memory unit is available, when a response indicating that the third management information stored in the memory unit has not been updated, is received from the third computer.

* * * * *